United States Patent

Maxwell, III et al.

[11] Patent Number: 6,064,953
[45] Date of Patent: May 16, 2000

[54] METHOD FOR CREATING A DISJUNCTIVE EDGE GRAPH FROM SUBTREES DURING UNIFICATION

[75] Inventors: John T. Maxwell, III, Cupertino; Ronald M. Kaplan, Palo Alto, both of Calif.

[73] Assignee: Xerox Corporation, Stamford, Conn.

[21] Appl. No.: 09/100,269

[22] Filed: Jun. 18, 1998

Related U.S. Application Data

[63] Continuation of application No. 08/668,988, Jun. 21, 1996, Pat. No. 5,819,210.

[51] Int. Cl.[7] .............................. G06F 17/27; G06F 17/21
[52] U.S. Cl. .................................................. 704/9; 704/10
[58] Field of Search ........................ 704/1, 9, 10; 707/6, 707/101; 395/705, 708, 709

[56] References Cited

U.S. PATENT DOCUMENTS 5,438,511  8/1995  Maxwell, III ............................... 704/1
5,727,222  3/1998  Maxwell, III ............................... 704/1

*Primary Examiner*—Forester W. Isen
*Assistant Examiner*—Patrick N. Edouard

[57] ABSTRACT

A method of unifying edge data structures using a processor. The method begins with creation of a first edge data structure and unifying it with a second edge data structure. If during unification any of the contexted lazy copy links associated with the second graph data structure are activated, then second graph data structure is expanded. Expansion involves first selecting a contexted lazy copy link from among the contexted lazy copy links associated with the second graph data, selecting a selected attribute from the subtree feature structure pointed to by the selected contexted lazy copy link, making a copy of the selected attribute and storing the copy of the selected attribute in the second graph data structure as a second attribute, and adding a contexted lazy copy link from the second attribute to the selected attribute value.

6 Claims, 19 Drawing Sheets

METHOD FOR CREATING A DISJUNCTIVE EDGE GRAPH FROM SUBTREES DURING UNIFICATION

This application is a continuation of application Ser. No. 08/668,988, filed Jun. 21, 1996, now U.S. Pat. No. 5,819,210.

REFERENCE TO MICROFICHE APPENDIX

This application includes a microfiche appendix for a computer program listing. This appendix includes 3 microfiche and 151 frames.

FIELD OF THE INVENTION

The present invention relates to natural language processing using computers. More particularly, the present invention relates to a method of unifying feature data structures used by machines to represent parts of natural language in less than exponential time.

BACKGROUND OF THE INVENTION

The explosion of information has created an unfulfilled demand for automated processing of natural language documents. Such an ability would enable natural language interfaces to databases, automated generation of extracts and summaries of natural language texts, and automated translation and interpretation of natural language. Development of these technologies is hindered by the time required to process modern grammatical formalisms.

Many modern grammatical formalisms use recursive feature structures to describe the syntactic structure of natural language utterances. (See Appendix A for definitions of technical terms used herein.) For instance, Lexical-Functional Grammar (Kaplan and Bresnan 1982), Functional Unification Grammar (Kay 1979), HPSG (Pollard and Sag 1987) and Definite Clause Grammars (Pereira and Warren 1980) all use recursive feature structures as a major component of grammatical descriptions. Feature structures have the advantage of being easy to understand and easy to implement, given unification-based programming languages such as Prolog. However, they have the disadvantage of making the resulting grammatical formalisms difficult to parse efficiently, both in theory and in practice. In theory grammatical formalisms that use arbitrary recursive feature structures can be undecidable in the worst case (Blackburn and Spaan 1993). Even with suitable restrictions, such as the off-line parsability constraint of LFG, the formalisms can be exponential in the worst case (Barton, Berwick, and Ristad 1987). Although in practice the sorts of phenomena that make a formalism take exponential time are rare, untuned unification-based parsers commonly take minutes to parse a moderately complex sentence.

There have been a number of different approaches to making unification-based parsers run faster. One approach has been to focus on making unification itself faster. In addition to the general work on efficient unification (Knight 1989), there has been work within the computational linguistics community on undoable unification (Karttunen 1986), lazy copying (Godden 1990), and combinations thereof (Tomabechi 1991). Another approach has been to focus on the problem of disjunction, and to propose techniques that handle special cases of disjunction efficiently. For instance, disjuncts that are inconsistent with the non-disjunctive part can be eliminated early (Kasper 1987). Also, certain types of disjunctions can be efficiently processed by being embedded within the feature structure (Karttunen 1984; Bear 1988; Maxwell and Kaplan 1989; Dorre and Eisele 1990). There has also been some work on the context-free component of grammatical formalisms. It has been shown that the granularity of phrase structure rules has an important effect on parsing efficiency (Nagata 1992). Also, the strategies used for handling the interaction between the phrasal and functional components can make a surprising difference (Maxwell and Kaplan 1993).

Lazy copy links are another way of reducing the processing time associated with unification. They do so by reducing the amount of copying required by a unification-based chart parser (Godden 90). Whenever feature structures from daughter constituents get unified together, the feature structures must be copied to prevent cross-talk. This is because the daughter feature structures may be used in other analyses of the sentence. However, copying feature structures is very expensive. Thus, in 1990 Godden proposed lazy copying of feature structures. With lazy copying at first just the top levels of each feature structure are copied. At the fringe of what has been copied, standard lazy copy links point back to the material that hasn't been copied yet.

Contexted unification is another method of reducing the processing time required for unification. Contexted unification is a method for merging alternative feature structures together by annotating the various alternatives with propositional variables that indicate the alternatives that they came from. Contexted unification is based on ideas from Assumption-Based Truth Maintenance Systems (deKleer 1986). The following rules formalize the basic idea of contexted unification:

1. $\phi_1 \vee \phi_2$ is satisfiable if and only if $(p \rightarrow \phi_1) \wedge (\neg p \rightarrow \phi_2)$ is satisfiable, where p is a new propositional variable;
2. If $\phi_1 \wedge \phi_2 \rightarrow \phi_3$ is a rule of deduction, then $(P \rightarrow \phi_1) \wedge (Q \rightarrow \phi_2) \rightarrow (P \wedge Q \rightarrow \phi_3)$ is a contexted version of that rule, where P and Q are boolean combinations of to propositional variables;
3. If $P \rightarrow FALSE$, then assert $\neg P$. (In ATMS terminology P is called a nogood.)

If we think of unification as a technique for making term rewriting more efficient by indexing equality relations in a feature tree, then contexted unification can be thought of in the same way, where the propositional variables get indexed with the equality relations, and then unification is performed in light of the above rules. Contexted unification is performed in three stages. First, the disjunctions are converted to conjunctions using Rule 1 above and instantiated as a feature structure. Afterward, feature structures are unified and nogoods are produced. Finally, the nogoods are collected and solved to determine which combinations of propositional variables are valid. This process was described in detail by Maxwell and Kaplan in 1989.

FIG. 1 illustrates a simple example of how contexted unification works. The first feature structure 20 results from instantiating the constraints a ([A+]V[B−])∧([C+]V[C−]). The second feature structure 22 results from instantiating the constraints ([A+]V[A−])∧([D+]V[D−]). Propositional variables p, q, r, and s have been introduced to represent the four disjunctions in the two constraints. Unification of feature structures 20 and 22 yields feature structure 24 and the nogood (p∧¬r). To find solutions to feature structure 24, all possible combinations of the propositional variable are computed that are consistent with the known nogood. In this case there are twelve possible solutions:

| | | |
|---|---|---|
| p∧q∧r∧s | ¬p∧q∧r∧s | ¬p∧¬q∧r∧s |
| p∧q∧r∧¬s | ¬p∧q∧r∧¬s | ¬p∧¬q∧r∧¬s |
| p∧¬q∧r∧s | ¬p∧q∧¬r∧s | ¬p∧¬q∧¬r∧s |
| p∧¬q∧r∧¬s | ¬p∧q∧¬r∧¬s | ¬p∧¬q∧¬r∧¬s |

The main advantage of contexted unification is the postponement of taking the cross product of alternatives until the nogoods have been found. This is helpful for at least two reasons. First, taking the cross-product of propositional variables is computationally cheaper than taking the cross product of feature structures. Second, contexted unification prevents taking unnecessary cross products because they are not taken until after it is discovered whether the unification is valid. Cross products are not taken if the unification is invalid.

Despite all these different approaches to reducing the processing time required for unification, a need still exists to decrease the total time required to unify feature structures.

SUMMARY OF THE INVENTION

An object of the present invention is to reduce the time required to unify two feature structures by reducing the time required to copy attributes and values from those feature structures.

A method unifying two edge data structures using contexted lazy copy links and a processor will be described in detail. Whenever a contexted lazy copy link associated with a first edge data structure is activated during unification, the contexted lazy copy links are expanded. First, the processor identifies the target attribute value pair of the activated contexted lazy copy link. Next, the processor copies the attribute of the target attribute value pair into the first edge data structure. Finally, the processor adds a contexted lazy copy link from the attribute copied into the first edge data structure to the value of the target attribute value pair.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

1. Overview

Figure 1:
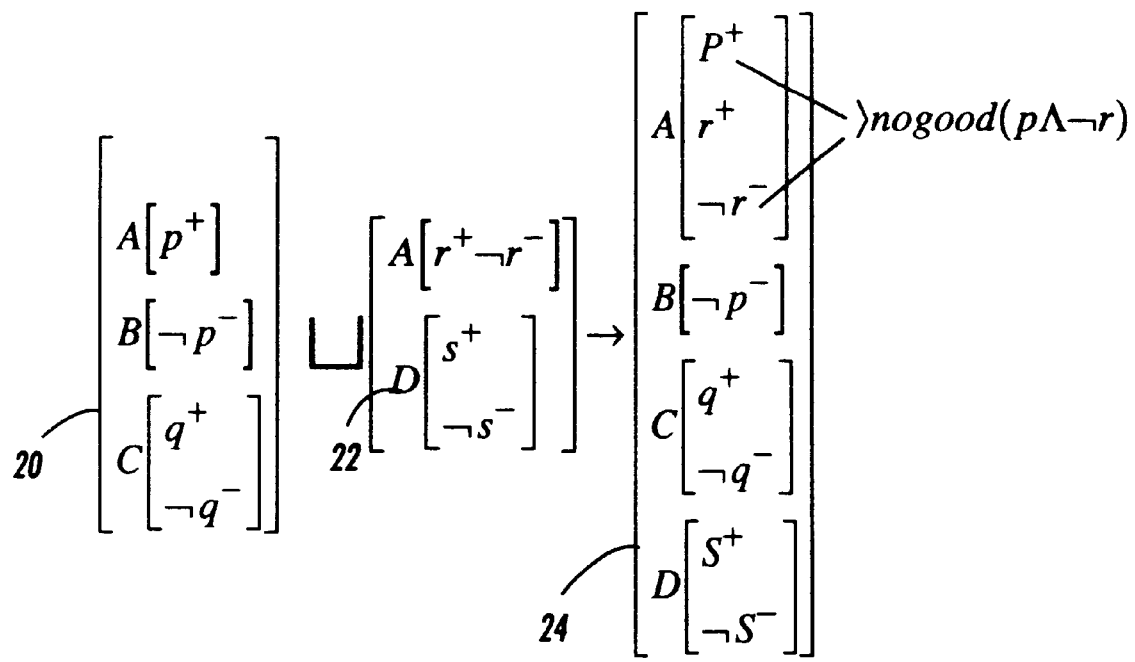
FIG. 1 is an example of contexted unification.
Figure 2:
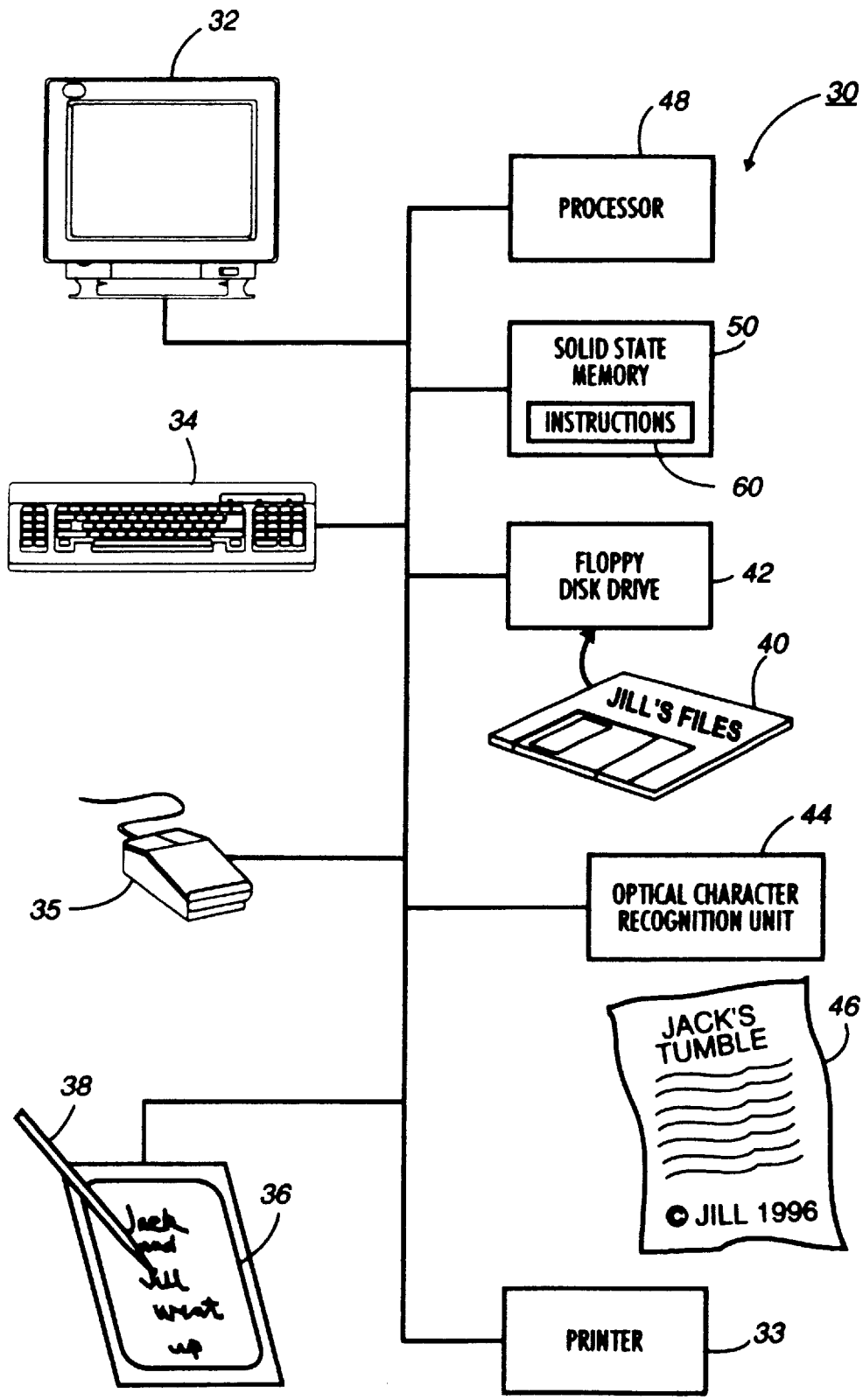
FIG. 2 illustrates a computer system that utilizes the methods of the present invention.

FIG. 2 illustrates computer system 30, which incorporates the contexted lazy copying methods of the present invention. Instructions 60 alter the performance of computer system 30, enabling system 30 to unify context free data structures in cubic time. Briefly described, instructions 60 reduce unification processing time by reducing the amount of information copied while unifying a first feature with a second feature structure. According to the method, alternative values of an attribute are represented by contexted lazy copy links, which indicate the analysis with which they are associated. When used in conjunction with contexted unification and opaque contexts, the present method enables unification to occur in cubic time for the parts of the grammar that are context-free equivalent.

A. Computer System for Contexted Unification Using Contexted Lazy Copying

Prior to a more detailed discussion of the present invention, consider computer system 30. Computer system 30 includes monitor 32 for visually displaying information to a computer user. Computer system 30 also outputs information to the computer user via printer. Computer system 30 provides the computer user multiple avenues to input data. Keyboard 34 allows the computer user to input data manually, as does mouse 35. The computer user may also input information by writing on electronic tablet 36 with pen 38. Alternately, the computer use can input data stored on machine readable media 40, such as a floppy disk, by inserting disk into floppy disk drive 42. Optical character recognition unit (OCR unit) 44 permits users to input hard copy natural language document 46, which it converts into a coded electronic representation, typically American National Standard Code for Information Interchange (ASCII).

Processor 48 controls and coordinates the operation of computer system 30 to execute the commands of the computer user. Processor 48 determines and takes the appropriate action in response to each command by executing instructions stored electronically in memory, either memory 50 or on floppy disk 40 within disk drive 42. Typically, operating instructions for processor 48 are stored in solid state memory, allowing frequent and rapid access to the instructions. Memory 50 also includes cache memory for storing clauses and restriction solutions. Semiconductor memory devices that can be used to realize memory 50 include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

II. The Problem with Standard Approaches to Unification

The contexted lazy copying method of the present invention takes advantage of the observation that standard approaches to parsing unification based grammars take exponential time even when the linguistic phenomena being modeled are context-free in power. That is to say, even when linguistic phenomena can be represented using simple phrase structure rules, such that a phrase structure parser will take at most $O(n^3)$ time to parse a sentence, where n is the length of the sentence in words, a standard unification based feature structure parser modeling the same sentence will take $O(2^n)$ time. Understanding why adding feature structures so dramatically increases parsing time requires an understanding of how a context-free grammar can be parsed in cubic time using a chart, and why adding feature structures makes the resulting system exponential if the standard approaches are used. Both topics are discussed in detail below.

A. Parsing Using a Chart

A chart is simply a data structure for caching the constituents that have already been constructed by a parser. The main advantage of having a chart is that the parser can reuse existing constituents as it tries to parse the sentence in different ways (Sheil 1976). If the grammar is context-free, then the parser doesn't need to know how constituents get constructed, only that they are constructable. For instance, the parser will need to know whether there is an NP that goes from the fifth word to the tenth word, but it doesn't need to know whether the NP has a PP in it. Because of this, there are only $O(Cn^2)$ different constituents that might be constructed for a sentence of length n, where C is the number of different categories that the grammar allows. The $n^2$ comes from the cross-product of all possible word positions. Conceptually, the chart is just a three-dimensional array of (Category, Left Position, Right Position) that indicates whether or not there is a constituent of type Category that starts at the Left Position and ends at the Right Position. A sentence has a parse if there is an S category that begins at the beginning of the sentence and ends at the end of the sentence. One way to fill in the chart is to start with all one word constituents, then build all of the two word constituents, then the three word constituents, and so on with each level building on the results of the previous levels. This is called the CKY algorithm (Younger 1967). The reason that the algorithm is $On^3$ rather than $On^2$ is that each constituent can be built in multiple ways. In the worst case, a constituent that is On in size can be built in On different ways. To build $On^2$ constituents in On ways each requires $On^3$ time. The CKY algorithm requires that constituents be built in a particular order, from smaller to larger. A more flexible way of building a chart is to keep an agenda of constituents that haven't been processed (Kaplan 1973, 1975). The constituents are taken off of the agenda one at a time, and processed as follows. Each constituent looks to its left and its right for constituents that it can combine with. When it finds a constituent to combine with, it checks the chart to see if the resulting constituent is already in the chart. If it isn't, then the constituent is added to the chart and placed on the agenda. The process then continues until the agenda is empty. The agenda makes things more flexible because constituents can be taken off of the agenda in any order. This sort of parser is called an "active chart parser".

As described, the above algorithms only determine whether or not a sentence is parsable, they do not determine what the valid parse trees are. However, this information can be obtained by simple additions to these algorithms. Whenever a constituent is constructed out of sub-constituents, the construction is recorded as a local subtree on the constituent that was constructed. A chart annotated with such subtrees is called a "parse forest". When the parser is done, a particular parse tree can be read out by starting at the S constituent that spans the whole sentence, and picking one subtree at random. Then for each daughter constituent, one subtree is picked at random. This process is carried on until the tree is fully specified. In general, there can be exponentially many such fully-specified trees, but the parse forest for them can be produced in cubic time because they are stored in a compact representation.

B. The Effect on Parsing of Adding Feature Structures

Many grammar formalisms add feature structures to a backbone of context-free phrase structure rules. Depending upon the grammar the context-free rules may be explicit, as is the case Lexical-Functional Grammar (Kaplan and Bresnan 1982), or implicit as the case with Functional Unification Grammar (Kay 1979).

A standard approach to parsing feature structures, regardless of whether the context-free rules are explicit or implicit, is to first build a context-free phrase structure chart, and then to make a second pass on the chart data structure, building feature structures bottom-up (see Maxwell and Kaplan 1993). First, feature structures are instantiated from lexical items according to the feature constraints given. If the lexical items are ambiguous in any way, this will produce multiple feature structures. Then, feature structures for a mother constituent are constructed by taking the cross-product of the feature structures that belong to the daughter constituents. We take the cross-product in order to filter out any combinations that may be inconsistent. The result is a set of feature structures that are consistent to this point. If there is more than one way of constructing the mother constituent out of daughter constituents, then the sets of feature structures produced from all of the analyses is unioned together. This process continues bottom-up until feature structures for all of the constituents have been constructed.

This process is exponential in the worst case because of the cross-product that occurs at each level. For instance, if each lexical item is two ways ambiguous, then even if the phrase structure grammar is unambiguous there can be $O(2^n)$ different feature structures for the top constituent. If only finite-valued features are used, then a parser can be made to run in cubic time. This is because there is only a finite number of feature structures possible, and at each level we only have to keep track of which of these is possible without enumerating all of the ways that we got them. Once we reach the upper bound on the number of possible feature structures then the number of feature structures at each level stops growing. If all of the feature values are binary, then the top level constituent can have at most $O(2^k)$ different feature structures, where k is the number of different features. Thus, we can turn an exponential in sentence length into an exponential grammar constant by using only finite feature graphs. Unfortunately, the time required to parse non-finite feature structures can not be reduced in the same manner.

III. Contexted Lazy Copying

The methods described herein reduce the time required to unify feature structures during parsing and generation by introducing contexted lazy copy links. This new type of lazy copy link allows multiple alternative values to be represented by multiple contexted lazy copy links, each of which has been annotated with the contexts in which it is valid. The data represented by these contexted lazy copy links is not copied into a graph data structure until it becomes relevant and is expanded gradually to ensure that only necessary information is copied. When used in conjunction with contexted unification and opaque contexts, contexted lazy copy links reduce the time required to unify feature structures. Accordingly, the present method is described in detail with respect to FIGS. 11 and 12 and as part of a method of unifying context free feature structures in cubic time.

A. Example of Contexted Unification with Lazy Context Copying

An example of contexted unification with lazy contexted copying will aid the coming detailed discussion of instructions 60 for performing contexted unification with contexted lazy copy links. Accordingly, consider FIG. 3, which illustrates edge 70 and its two daughter edges 72 and 82. Daughter 72 begins with an empty graph 74 with contexted lazy copy links, indicated via dotted lines, pointing to alternative fully specified graphs 75, 76, 78, and 80. Note that each lazy copy link is annotated with a context, p:1, p:2, p;3, and p:4, each of which represents a mutually exclusive choice. The situation of daughter 82 is analogous to that of daughter 72.

Unification of graphs 74 and 84 begins with creation of empty graph 71 and assertion of contexted lazy copy links from graph 71 to graphs 74 and 84. These contexted lazy copy links are bolded to indicate that interaction between the lazy copy links has been detected and that graph 71 will have to be expanded, which, in turn, requires expansion of daughter graphs 74 and 84.

Figure 4:
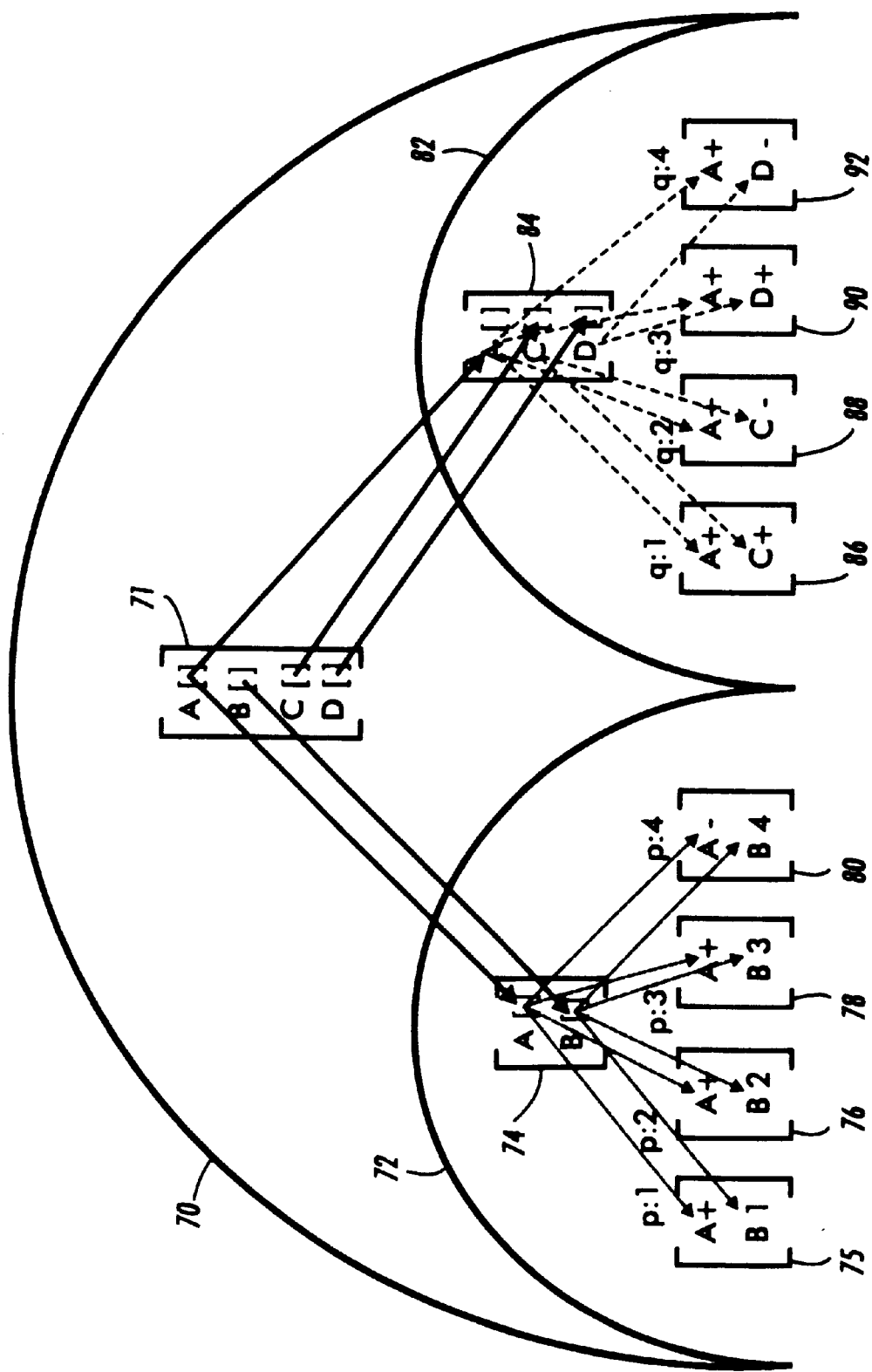

FIG. 4 illustrates graphs 71, 74 and 84 after the required expansion. Daughter graph 84 has been expanded by copying up the first level of the alternative graphs 86, 88, 90, and 92. As a result, graph 84 is no longer empty, now containing the attributes A, C, and D. The values for these attributes are indicated via multiple contexted lazy copy links which point to values within feature structures 86, 88, 90, and 92. Note that while attribute C takes values only in contexts q:1 and q:2 and attribute D takes values only in contexts q:3 and q:4, a single graph 84 can be created that represents all of these mutually exclusive alternatives. Daughter graph 74 is expanded in a similar fashion. Next, graph 71 is expanded by copying into it the first level attributes of graphs 74 and 84, A, B, C, and D, with contexted lazy copy links pointing to the alternative values for those attributes. Bolding of the contexted lazy copy links associated with the A attribute indicate that they are interacting. Thus, the A attribute of graph 71 must be expanded, which means the A attributes of graphs 74 and 84 must also be expanded.

Figure 5:
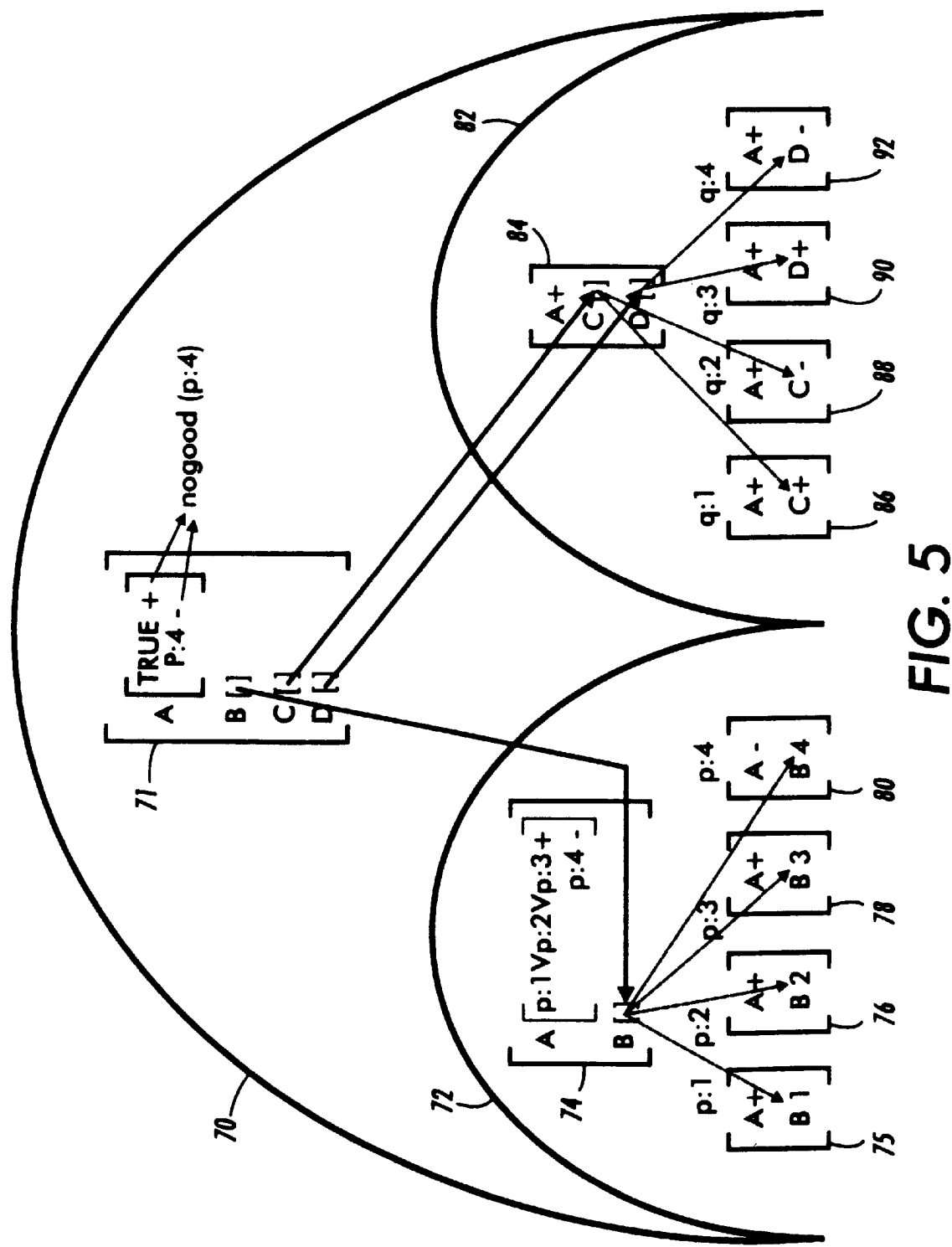

FIG. 5 illustrates graphs 71, 74, and 84 after the expansion of their A attributes. With respect to graph 74, this expansion replaces the contexted lazy copy links with two context value pairs. The A attribute takes the value + when either context p:1, p:2, or p:3 is TRUE. On the other hand, the A attribute takes the value – when context p:4 is TRUE. In contrast to graph 74, expansion of the A attribute in graph 84 results in a single uncontexted value because the A attribute takes the same value in all of the contexts associated with feature structure 84. Unification of the A attributes from graphs 74 and 84 results in two context value pairs for the A attribute of graph 71. One context value pair states that A=+ in all contexts while the other context value pair states that A=– in context p:4. These two context value pairs result in the nogood p:4 because attribute A cannot simultaneously take the values + and –.

After performing all unifications, the nogood database is used to determine the possible solutions to the chart. Naively combining the nogoods can result in exponential processing time to find the solutions for the chart. Further, if propositional variables are copied up from daughters to their mothers those propositional variable may encode the structure of the tree, violating context-freeness and requiring exponential processing time. To avoid these problems, new, opaque propositional variables are introduced at each level. These propositional variables are called "opaque" because their internal structure is not available to the higher level to which they are imported. The process of making a propositional variable opaque prior to its importation is called wrapping. The nogood database is then solved locally in terms of the opaque variables that are imported from below. If the grammar is context-free equivalent, then the number of opaque variables will be bounded, allowing the nogood database to be solved locally in terms of the opaque variables that are imported from below.

In general, each daughter constituent has a set of opaque variables that have been imported by the subtree used to construct a mother constituent. Solutions that assign the values of TRUE or FALSE can be found for these opaque variables using the nogood database. These solutions are found by taking the cross-product of the daughter solutions, which are then filtered by the local nogoods. If there are multiple subtrees, then the context of the local subtree is added to each solution. For each solution, the opaque variables of the mother constituent are evaluated to determine whether the local subtree solution makes the opaque variables TRUE or FALSE. Each such assignment becomes a solution to the mothers opaque variables. There may be several local solutions for each assignment of values to the mother's opaque variables. This is analogous to there being multiple subtrees for each constituent in a context-free parse forest, where the "constituent" in this case is some set of feature-value combinations.

Figure 3:
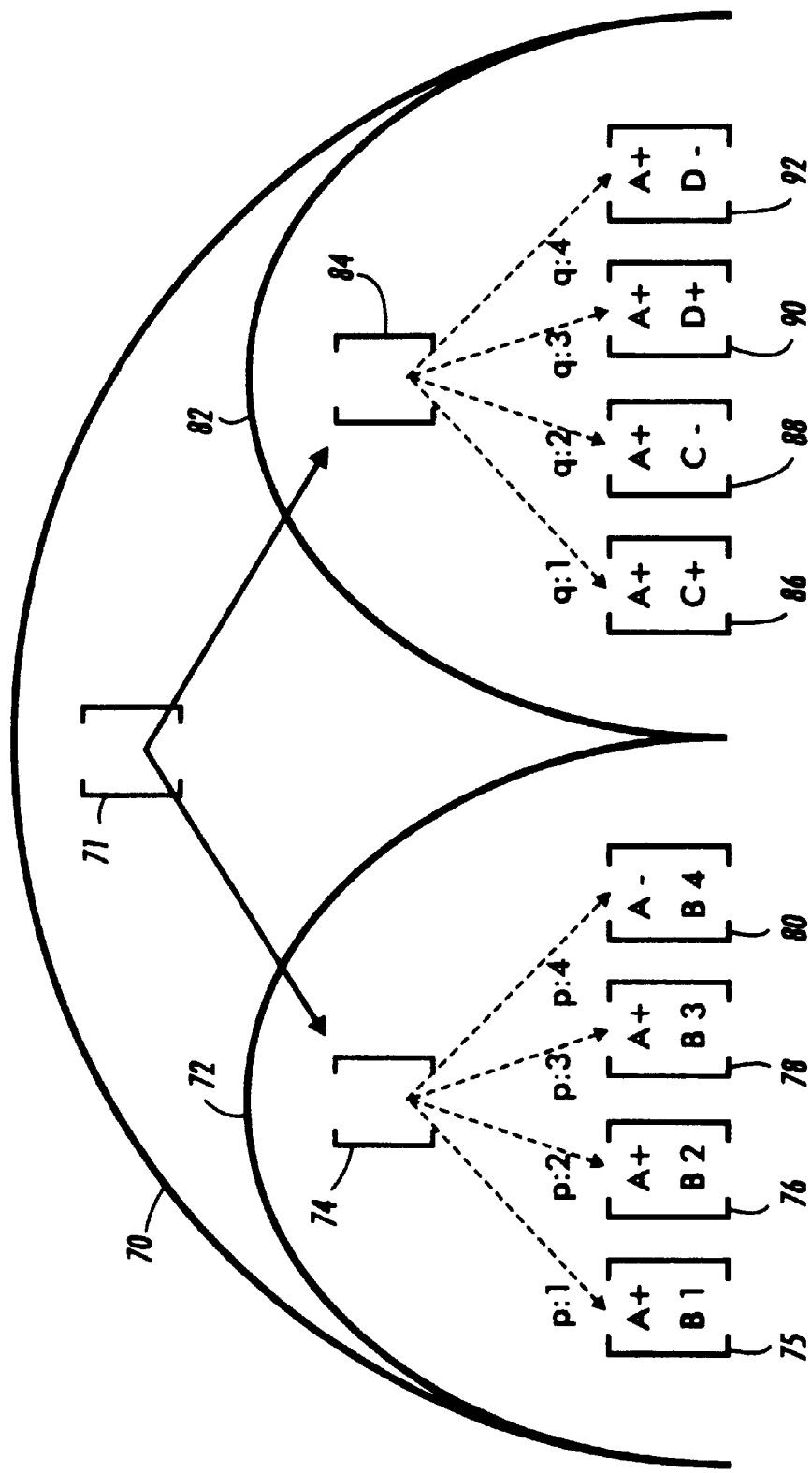
FIGS. 3–6 illustrates an example of contexted unification according to the method of the present invention.
Figure 6:
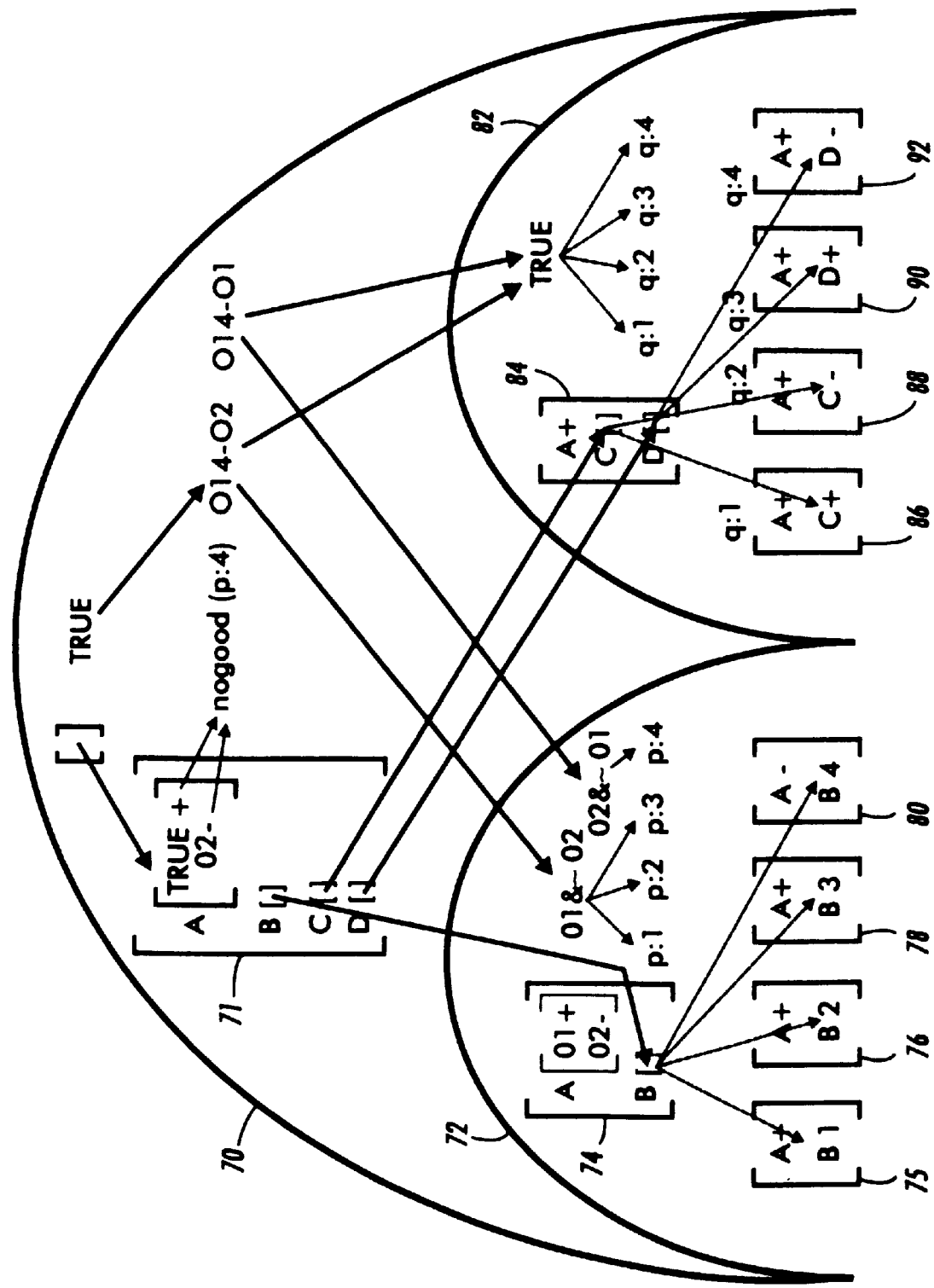

FIG. 6 illustrates solution of the chart discussed in FIGS. 3–5. Daughter feature structure 74 has two opaque variables: O1 and O2. In contrast, daughter feature structure 84 has no opaque variables because none of its contexts are exported. This situation produces two external solutions for daughter 72: O1∧¬O2 and O2∧¬O1. The O1∧¬O2 solution represents three internal solutions: p1, p2, and p3. The O2 ∧¬O1 solution represents only the internal solution p:4. Daughter feature structure 84 generates just one external solution in the TRUE context, which represents four internal solutions. Solutions for mother edge 70 are constructed by taking the cross-product of the external solutions imported from daughter edges 72 and 82 and filtering those solutions by the local nogood O2. This produces one internal solution, O1 ∧¬O2, for edge 70, which is associated with the external solution TRUE. The internal solutions of each mother are used to track the daughter solutions that they came from to facilitate enumeration of solutions.

B. Overview of Data Structures and Instructions for Lazy Contexted Unification

Figure 7:
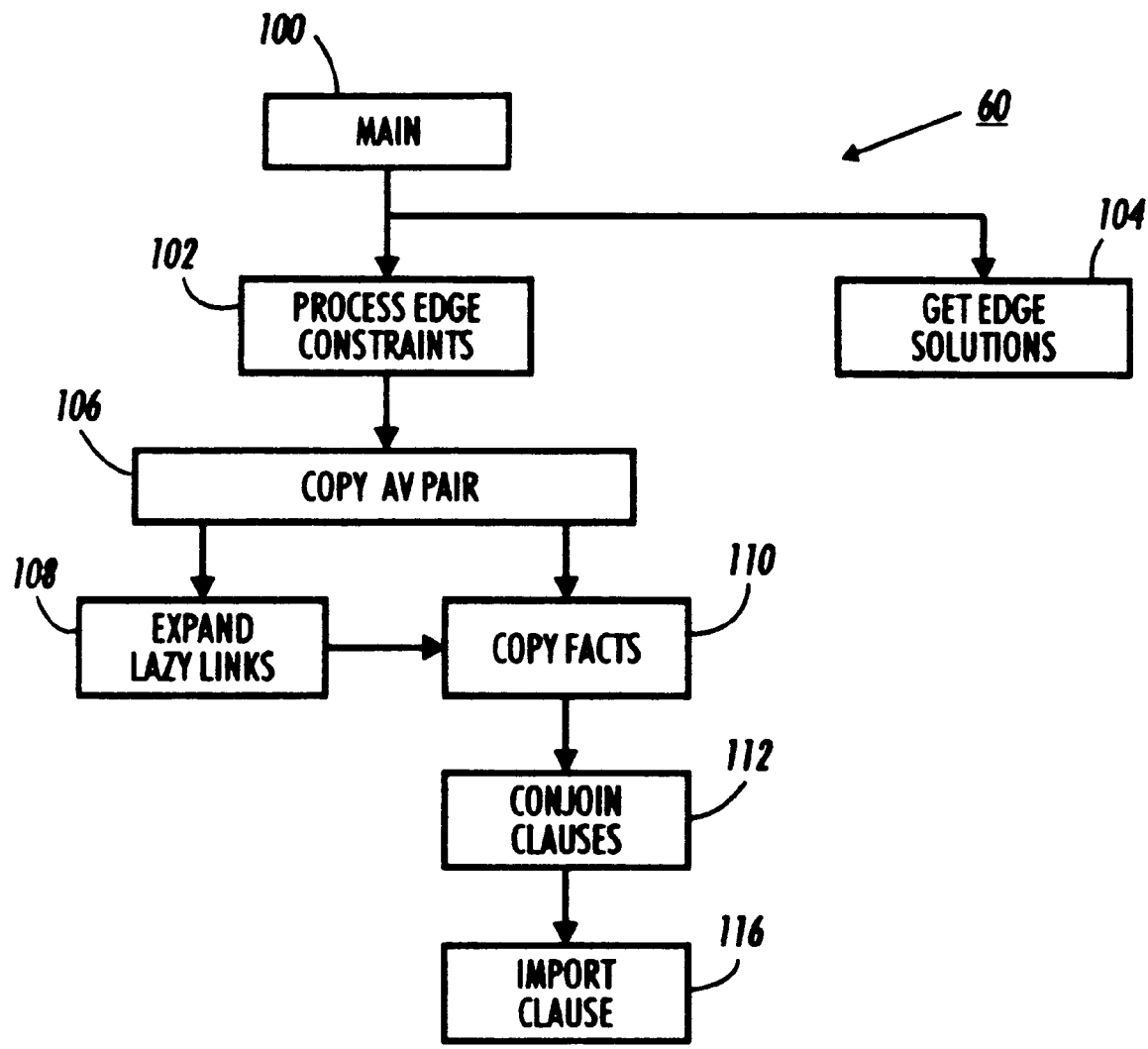
FIG. 7 is an object diagram of the software routines implementing the method of the present invention.

FIG. 7 illustrates schematically instructions 60 for lazy contexted unification of feature structures while parsing or generating a language string. Instructions 60 may be stored in machine readable form in solid state memory 50 or on floppy disk 42 placed within floppy disk drive 40. Instructions 60 may be realized in any computer language, including Prolog, LISP and C++.

Instructions 60 are organized as a hierarchical set of subroutines 100, 102, 104, 105, 108, 110, 112, 114, and 116. Main 100 controls the parsing of the string by calling Process Edge Constraints 102 and Get Edge Solutions 104. Process Edge Constraints 102 takes the constraints imposed on each edge and generates edge data structures for each edge. In doing so, subroutine 106 calls upon Copy AV Pairs 106. Subroutine 106 handles the copying of attribute value pairs from one graph to another by calling upon subroutines 108 and 110. Expand Lazy Links 108 expands a contexted lazy copy link by copying up one level of attributes and adding a new contexted lazy copy link for each attribute copied. Copy Facts 110 copies attributes from one graph into another. In doing so, subroutine 110 calls Conjoin Clauses 112. Conjoin Clauses 112 conjoins two contexts, or clauses, together to produce a new clause, which may be opaque, when appropriate. Import Clause 116 generates opaque clauses when a clause is being imported into a graph. Finally, Get Edge Solutions 104 takes the feature structures generated by subroutine 102 and determines possible solutions to the root spanning edge.

The upcoming detailed discussion of instructions 60 is aided by knowledge of the data structures used, which are stored in memory 50. Instructions 60 use four classes of data structures: chart, graph, clause, and solution data structures. Chart Data structures include Edge Data Structures and Subtree Data Structures. Each Edge Data Structure represents an edge and includes the following information:

Edge[
id: an integer uniquely identifying this edge
right: an integer identifying the rightmost word of the edge
left: an integer identifying the leftmost word of the edge
category: indicates the grammatical category of the edge; e.g., NP, S, VP, etc.
subtrees: a list of the various ways of making this edge
graph: a pointer to the graph data structure for this edge
]

Each Subtree Data Structure represents a subtree in Chomsky Normal Form. and includes the following information:

Subtree[
partial: points to the left daughter of the rule, a partial starts at the leftmost word of the edge and ends somewhere in the middle
complete: points to the right daughter of the rule, a complete starts somewhere in the middle of the edge and ends at the rightmost word of the edge
constraint: defines how partial and complete should be combined to produce the subtree
graph: a pointer to the graph data structure for this subtree
]

Note that each subtree data structure includes only two daughters, partial and complete, even though conceptually context-free rules permit an arbitrary number of daughters per subtree. Application of a standard transformation to a grammar produces a new grammar in which all rules are binary. For example, by applying this transformation to the rule S→NP VP ADV two rules are produced S→S1 ADV and S1→NP VP.

The class of Graph Data Structures include three types: Graph, AVPair, and CVPair. Each Graph Data Structure represents a feature structure and related information and includes the following information:

Graph [
attrs: a list of pointers to the AVPairs associated with this graph data structure
context: represents the context that this graph is in, and corresponds a variable assigned to a subtree to distinguish it from other valid subtrees associated with the same edge
nogood: a boolean value indicating whether this feature data structure is nogood
nogoods: a list of clauses that are nogood and associated with this graph
edge: a pointer to the edge associated with this graph
disjunctive: a boolean value that indicates whether or not the graph is an OR graph; i.e., a single graph that represents many alternative graphs
clauses: a list of clauses allocated in this graph
disjunctions: a list of locally instantiated disjunctions
solutions: a list of pointers to Restriction Sets and their solutions
]

Each AVPair Data Structure represents an attribute contexted value pair and includes the following information:

AVPair[
attr: the name of the type of attribute
attrs: a list of pointers to the attributes that are included in the feature structure that this AVPair represents
equals: a list of pointers to CVPair data structures that store the value for this attribute; e.g., if attr is NUM then the values in this field might by SG in one context and PL in another context
copies: a list of pointers to CVPair data structures that store copy links to values that have been copied to or copied from this AVPair
contexts: contexts in which this AVPair already has constraints
prefix: a pointer to the AVPair that includes this AVPair. For example, in the LFG term (↑ SUBJ NUM), the NUM AVPair would have the (↑SUBJ) AVPair as its prefix.
graph: a pointer to the feature data structure that this AVPair belongs to
expanded: a boolean value that indicates whether the contexted lazy links associated with this AVPair have been expanded
]

Each CVPair data structure represents a context value pair and includes the following information:

CVPair[
contexts: the context, or clause, associated with this value, for regular copy links the context is TRUE, any other value indicates a contexted value
value: this field my include a value or a pointer to another AVPair data structure, depending on whether the pointer to this CVPair is stored in the equals field or copies field of an AVPair
lazy: a boolean variable that indicates whether the value field is a forward copy link pointing forward to a recipient or is a lazy copy link that points backward to a source
].

There are two types of Clause Data Structures: Clause and Disjunction. Each Clause Data Structure represents a clause and has its own clause cache, which is a list of cache items. A Clause Data Structure includes the following information:

```
Clause:[
   type: Clause type- AND, OR, CHOICE, OPAQUE, nogood, TRUE
   body: union of{
        AND { -- this type of clause is a conjunction of contexts
                first: a pointer to the first clause of the conjunction
                rest: a pointer to the rest of the conjoined clauses
        }
        OR{ -- this type of clause is a disjunction of contexts--
                first: a pointer to the first clause of the disjunction
                rest: a pointer to the rest of the disjoined clauses
                }
        NOT{ -- this type of clause is a negation of a context--
                negated: the clause negated
                }
        CHOICE{ -- this a primitive choice of disjunction
                    disjunction: pointer to disjunction data structure
   containing the choice
                }
        OPAQUE{--this imports a context
                    imported: the imported clause that is being wrapped
        graph: a pointer to graph data structure from which clause
                was imported
                }
        }
``` graph—a pointer to the graph data structure with which this clause is associated
cache—a pointer to an area of the clause cache associated with this clause. This area of the clause cache stores results of previously performed operations with this clause
exported—a boolean variable that indicates whether this clause has been imported to another graph data structure
nogood—boolean variable that indicates whether this clause has been determined to be nogood
]

Each Disjunction Data Structure represents a disjunction includes the following information:

Disjunction[
   count—integer indication the number of disjuncts in this disjunction
   context—the context with which this disjunction is associated
   arm1—the first choice context (if only one)
   disj1—the first choice disjunction (if more than one)
   arm2—the second choice context (if only one)
   disj2—second choice disjunction (if more than one)
].

There are three types of Solution Data Structures: Restriction Set, Restricted Solutions and Internal Solution Data Structures. Each graph has a solution cache within memory 50 that stores the graph's three solution data structures.

Each Restriction Set data structure represents a set of clauses for which solutions are sought and includes the following information:
   Restriction Set[
      restriction set: a list of clauses given to Get Edge Solutions for solution
      solutions: a list of pointers to restricted solution data structures for the restriction set
Each restricted solution data structure represents solutions to a restricted set and includes the following information:
   Restricted Solution[
      clauses: the group of clauses that make up a solution. For example, if the restriction set is a:1, b:0, and (a:0 & b:0), then a solution might b:0 and (a:0 & b:0). This should be a subset of the restriction set. If there is a clause in the restriction set that isn't in this field, then it's value is presumed to be FALSE.
      map: list of pointers to Internal Solution data structures that evaluate to the solutions in the clauses field. For any particular restriction set, all of the internal solutions must be a member of the map of exactly one restricted solution. Each internal solution appears once in each restriction set.
]
Each Internal Solution data structure represents internal solutions to a restricted set and includes the following information:
   Internal Solution[
      graph—a pointer to the graph that this internal solution was extracted from
      choices—a list of local choices of local disjunctions
      partial—a solution for the partial edge; i.e., left daughter
      complete—a solution for the complete edge
   ]

C. The Main Routine 100

Figure 8:
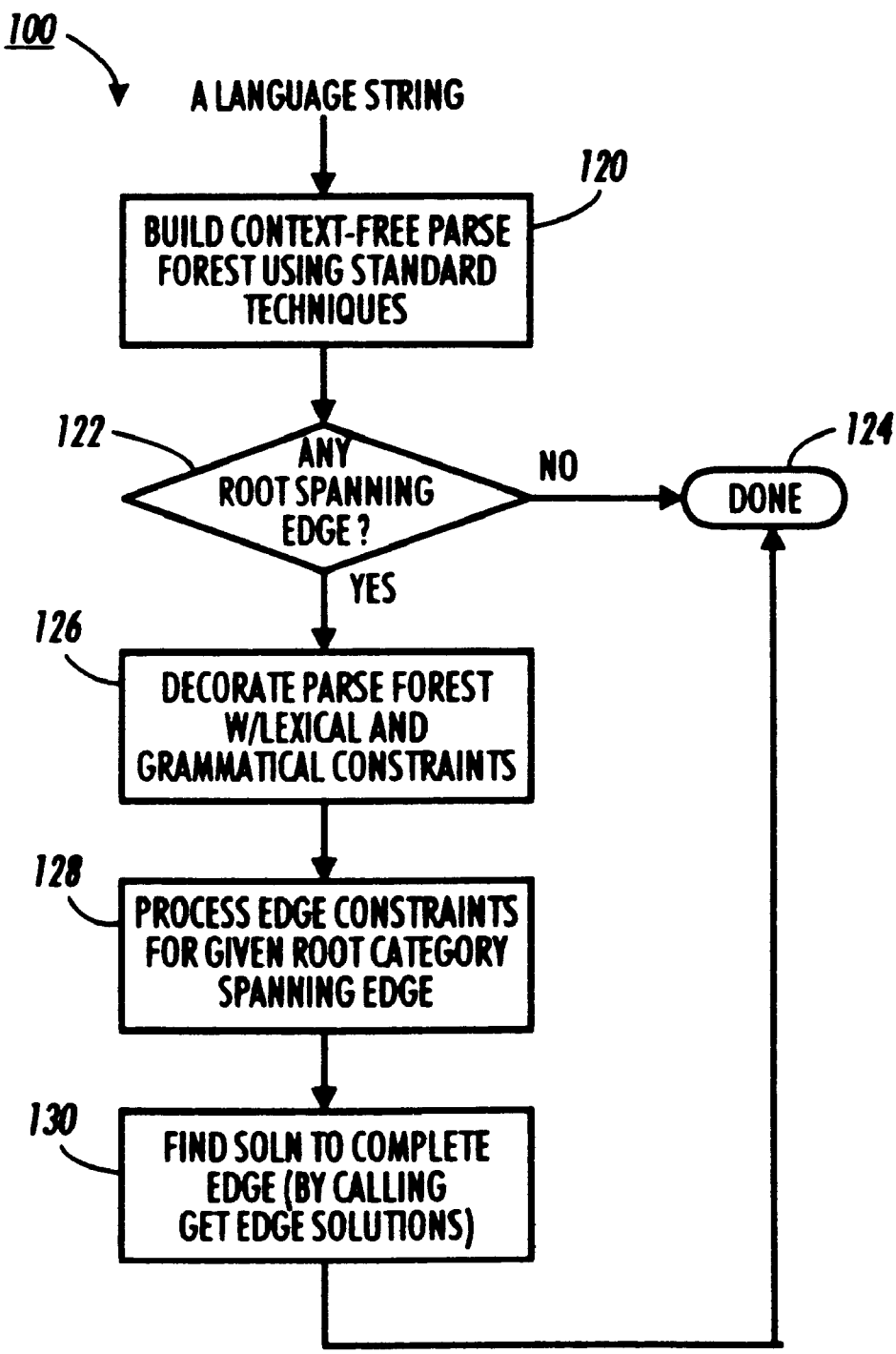
FIG. 8 is a flow diagram of the Main routine.

FIG. 8 illustrates in flow diagram form the instructions of Main 100. Briefly described, Main 100 builds a chart for a natural language string, to processes the edge constraints of the chart and builds graph data structures for the chart in a bottom-up fashion. After finding the graph feature structure for the root-spanning edge, processor 48 finds solutions for that edge.

Upon receipt of a natural language string in machine readable form, processor 48 begins execution of instructions 100 with step 120. During step 120 processor 48 builds a context free parse forest, a chart, for that natural language string. Standard techniques, known to those of ordinary skill in the art, are used to build the chart. The chart constructed, processor 48 exits step 120 and advances to step 122.

Processor 48 determines during step 122 whether the chart defines a string S that spans the entire natural language string. If the chart does not, then it has no solution and processor 48 branches to step 124. On the other hand, if the chart defines an S that spans the entire natural language string, then the chart may have a solution. In response, processor 48 advances to step 126 from step 122. During step 126 processor 48 adds to the chart the lexical and grammatical constraints associated with the grammar being used. Standard methods of decorating the chart are used. After decorating the chart, processor 48 exits step 126 and advances to step 128.

Processor 48 finds solutions for the root spanning edge of the chart during step 128 by recursively Process Edge Constraints 102 and building graph data structures for the chart. These recursive calls cause processor 48 to walk down the chart until a leaf is reached, at which point processor 48 begins building graph data structures and walking back up the chart. Process Edge Constraints 102 will be described in detail later with respect to FIG. 9. Having generated graph data structures for the chart, processor 48 advances to step 130 from step 128 and begins the process of finding a solution to the chart. Processor 48 does so by calling Get Edge Solutions 104. Processor 48 finds solutions to the root spanning edge by walking down the chart, passing down opaque contexts of interest, until a leaf is reached. At that point, processor 48 begins determining local solutions to opaque contexts that have been imported and passing those solutions back up the chart. This continues until solutions have been found for the root spanning edge of the chart.

Processing of edge solutions by instructions 104 will occur in cubic time for context-free parts of the grammar. Context-freeness causes local nogoods to factor nicely. Thus, even though solution computation time is an exponential in the number of opaque variables, K, experience has shown the number of solutions actually produced tends to be small. After executing instructions 104, processor 48 exits step 130 and branches to step 124, processing of the natural language string complete.

D. The Process Edge Constraints Routine

Figure 9A:
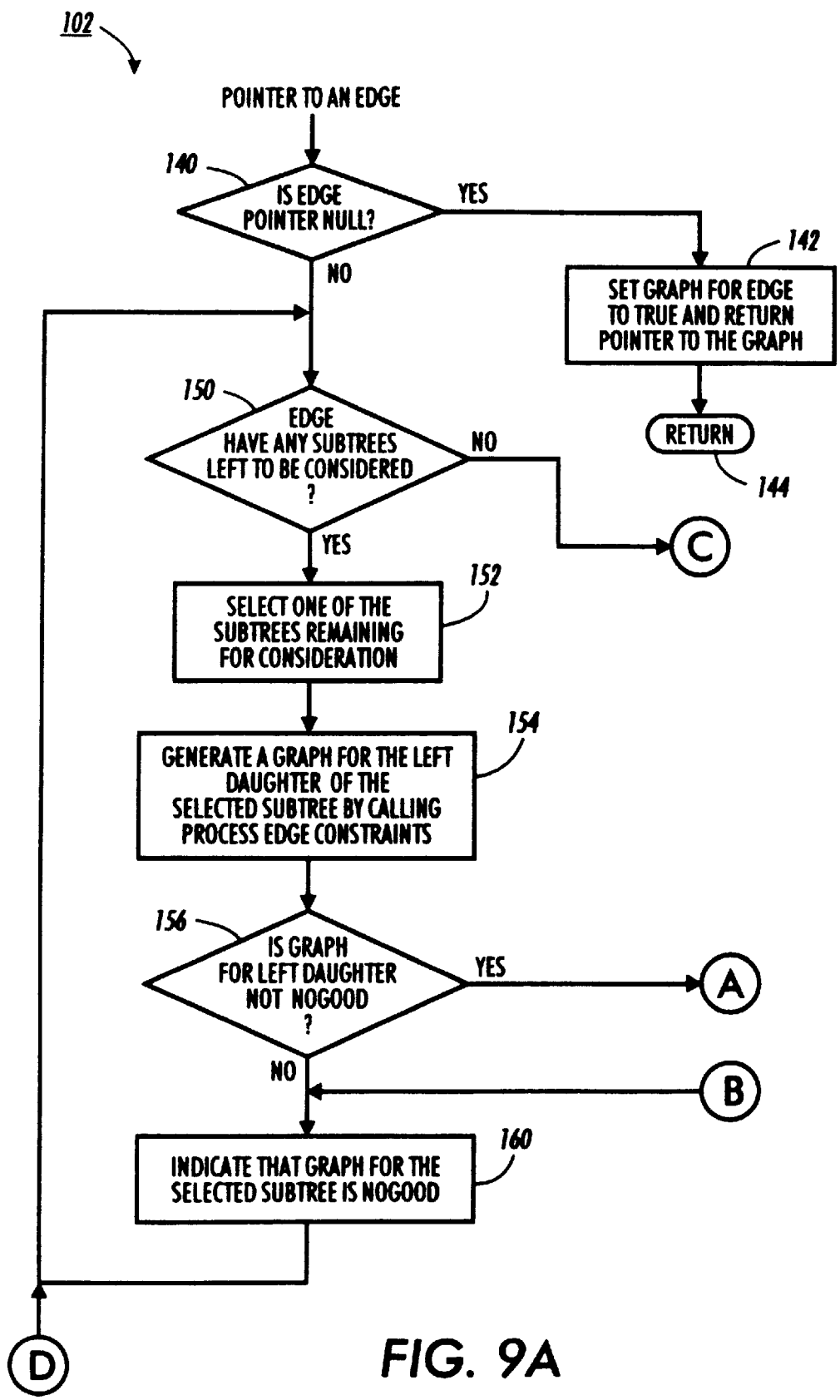
FIG. 9 is a flow diagram of the Process Edge Constraints routine.
Figure 9B:
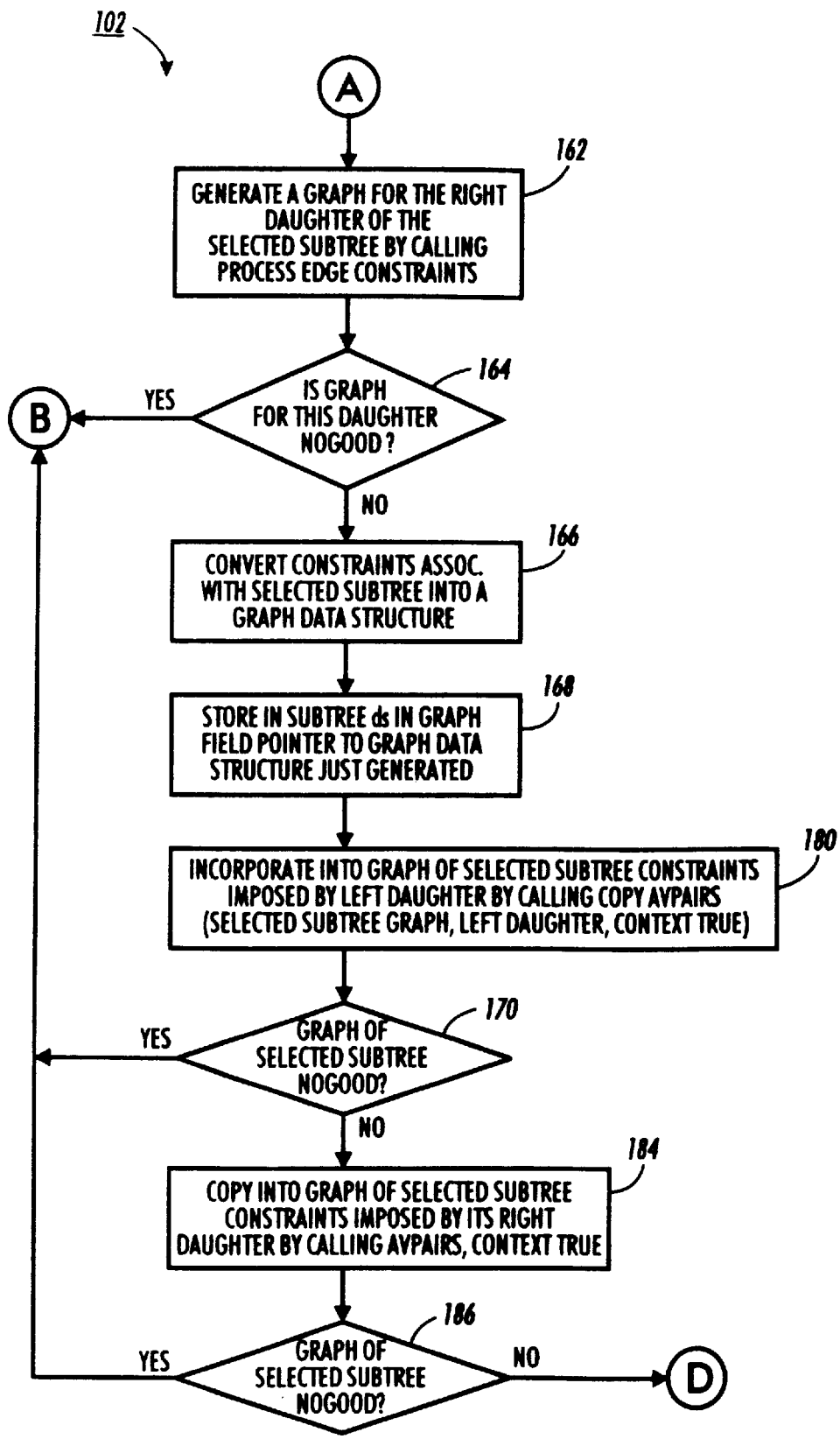
Figure 9C:
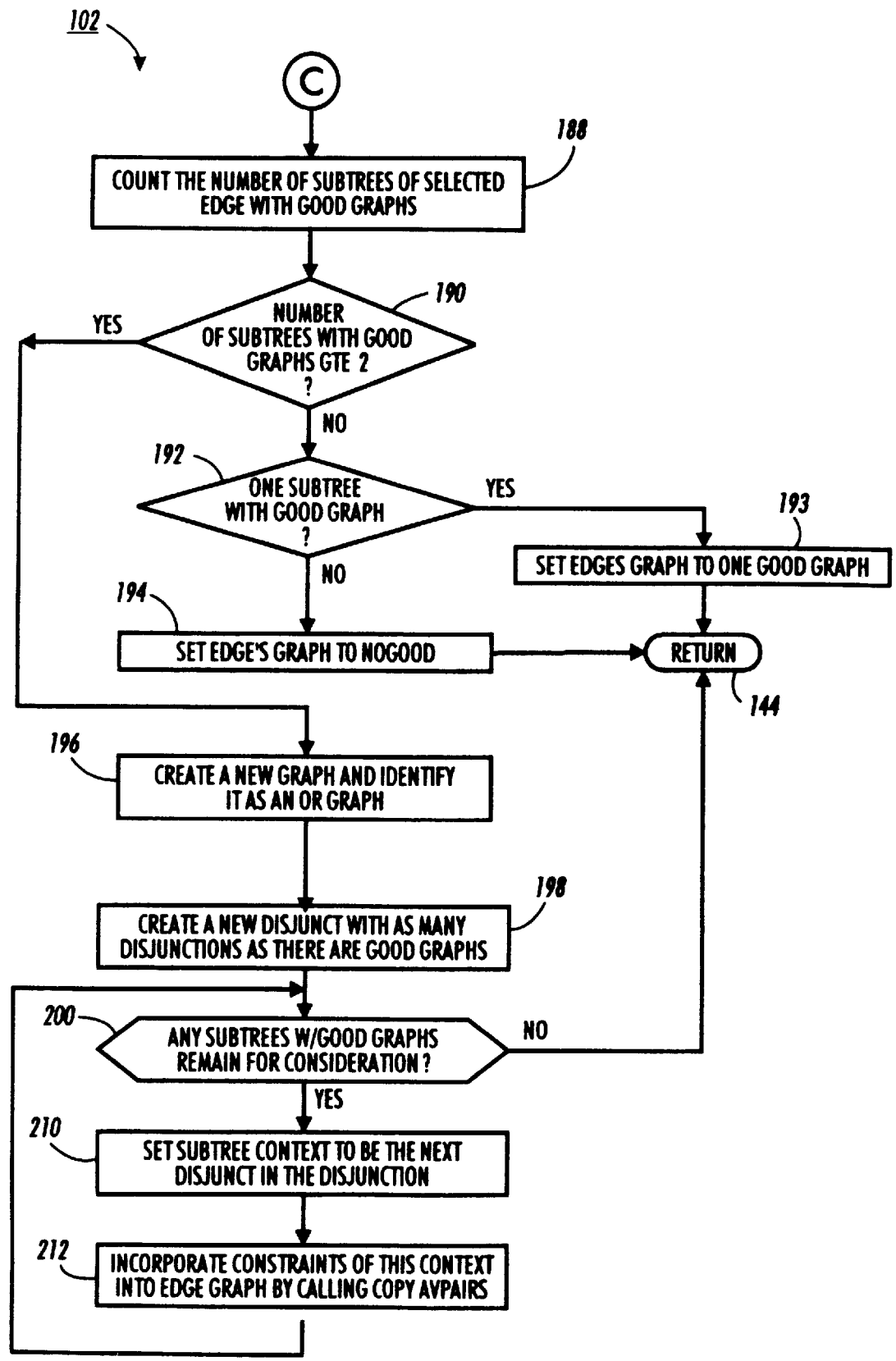

Process Edge Constraints 102, illustrated in FIG. 9, enables processor 48 to create a graph data structure for an edge given a pointer to the relevant edge. Briefly described, as each graph data structure represents all of the alternative ways that the edge can be constructed, instructions 102 begin by creating a graph data structure for each subtree associated with the edge in steps 150–188. To generate a graph data structure for an edge, graph data structures are first generated for each daughter of the subtree in steps 154–164. Using these, graph data structures are created for each subtree in steps 166–186 and with those a graph data structure is finally created for the edge during steps 190–212.

In response to receipt of a pointer to a selected edge processor 48 begins execution of instructions 102 with step 140. During step 140 processor 48 determines whether a graph data structure need be constructed by examining the pointer just received. A null pointer indicates that the selected edge does not exist, perhaps because it is from a subtree that has no partial edge. In response to a null edge pointer, processor 48 branches to step 142 from step 140. During step 142 processor 48 indicates that the selected edge is TRUE; i.e., can be combined with any other edge, by setting to a value of 0 the pointer stored in the graph field of the selected edge data structure. Afterward, processor 48 returns to the calling routine.

If the edge pointer is not null, processor 48 branches to step 150 from step 140. With step 150, processor 48 turns its attention to building a graph data structure for the selected edge. To do so, processor 48 must first generate graph data structures for each subtree associated with the selected edge. Thus, during step 150 processor 48 determines whether there are any subtrees for which a graph data structure should be generated. So long as there are, processor 48 advances to step 152 from step 150.

Processor 48 selects one of the remaining subtrees as the selected subtree during step 152 and then advances to step 154. Processor 48 will generate a graph data structure for the selected subtree by first creating graph data structure for both the left daughter and the right daughter. Thus, during step 154 processor 48 creates a graph data structure for the left daughter of the selected subtree by a recursive call to Process Edge Constraints 102 and indicating the left daughter as the selected edge. Having generated a graph data structure for the left daughter of the selected subtree, processor 48 exits step 154 and advances to step 156.

During step 156 processor 48 determines whether the graph for the left daughter is nogood. Processor 48 makes this determination by examining the nogood field of the graph data structure for the left daughter or if the pointer to the graph is the NOGOOD value; i.e., 1. If the graph is nogood, then the graph for the selected subtree will also be nogood. In this case, processor 48 advances to step 160 and generates a nogood graph data structure for the selected subtree. That done, processor 48 returns to step 150. On the other hand, if the graph for the left daughter is not nogood, then processor 48 exits step 156 and advances to step 162.

Processor 48 turns its attention to generating a graph data structure for the right daughter of the selected subtree during step 162. Processor 48 performs this task by calling Process Edge Constraints 102 and indicating that left daughter is the selected edge. Afterward, processor 48 determines whether or not the graph data structure is nogood during step 164. If so, processor 48 returns to step 150. If not, processor 48 exits step 164 and advances to step 166.

Having generated graph data structures for both the left and right daughters of the selected subtree, processor 48 begins the process of constructing a graph data structure for the selected subtree during step 166. In this effort, the first task is to convert any grammatical constraints associated with the selected subtree into a graph data structure. Next, during step 168 processor 48 stores a pointer to the graph data structure just created in the graph field of the subtree data structure of the selected subtree. Processor 48 then advances to step 180.

During step 180 processor 48 begins incorporating constraints into the selected subtree that are imposed by its left daughter. Processor 48 does so by calling Copy AVPair 106, which copies one AVPair at a time and will be described in detail later. Afterward, during step 182, processor 48 determines whether this causes the graph data structure of the selected subtree to be nogood. If so, processor 48 returns to step 150. If not, processor 48 exits step 182 and advances to step 184.

Processor 48 incorporates into the selected subtree constraints imposed by its right daughter during step 184. Processor 48 does so by again calling Copy AVPair 106. Processor 48 then determines whether these constraints make the selected subtree's graph nogood during step 186. If so, processor 48 returns to step 160. If the graph is not nogood, processor 48 returns to step 150 from step 186.

Processor 48 branches through steps 150–186 so long as there are graph data structures to be generated for subtrees associated with the selected edge. Once all subtree graph data structures have been generated, processor 48 exits step 150 and branches to step 188 to begin the process of creating a single graph data structure for the selected edge that represents each of its not nogood subtrees. Processor 48 first counts the number of subtrees associated with the selected edge that have not nogood graphs during step 188. Next, during step 190, processor 48 determines whether the number of subtrees with not nogood graphs is greater than or equal to two. If that number is less than two, processor 48 determines whether there is at least one subtree with a not nogood graph during step 192. If there is one subtree with a not nogood graph, processor 48 advances to step 193 and stores a pointer to the graph data structure for the good subtree in the graph field of the edge data structure of the selected edge. On the other hand, if there is not at least one subtree with a good graph, then processor 48 exits step 192 and advances to step 194. Processor 48 then uses the graph field of the selected edge data structure to indicate that the edge is nogood by storing a pointer value of 1. Having completed construction of a graph data structure for the selected edge during step 194 or 193, processor 48 advances to step 144.

Processor 48 advances to step 196 when the number of subtrees with not nogood graphs is greater than, or equals, two. In this case, the graph data structure of the selected edge will be an OR type because it will represent multiple, alternative subtrees. Thus, during step 196 processor 48 marks the graph as OR type by appropriately setting the disjunctive field of the selected edge data structure. That done, processor 48 exits step 196 and advances to step 198.

During step 198 processor 48 builds disjunction data structures for the OR clause just generated in step 196. Processor 48 sets the count field of the disjunction data structure to the number of good graphs counted during step 188. Processor 48 then completes construction of the disjunction data structure, which produces contexted variables to represent each of the good subtrees associated with the selected edge. Afterward, processor 48 advances to step 200.

With step 200 processor 48 begins incorporating information from the subtrees into the graph data structure for the selected edge. Processor 48 branches through the loop of steps 200, 210 and 212 until the information from all of the good subtrees has been incorporated into the selected edge data structure. During step 212 processor 48 selects one of the subtrees with a not nogood graph and finds the context associated with that subtree by the disjunction data structure. Processor 48 then copies up into the selected edge data structure information from the selected subtree by calling Copy AVPairs 106 and indicating the selected clause. Afterward, processor 48 returns to step 200. After copying information from all of the subtrees with good graphs into the graph data structure for the selected edge, processor 48 returns to step 144.

E. The Copy AVPair Routine

Figure 10:
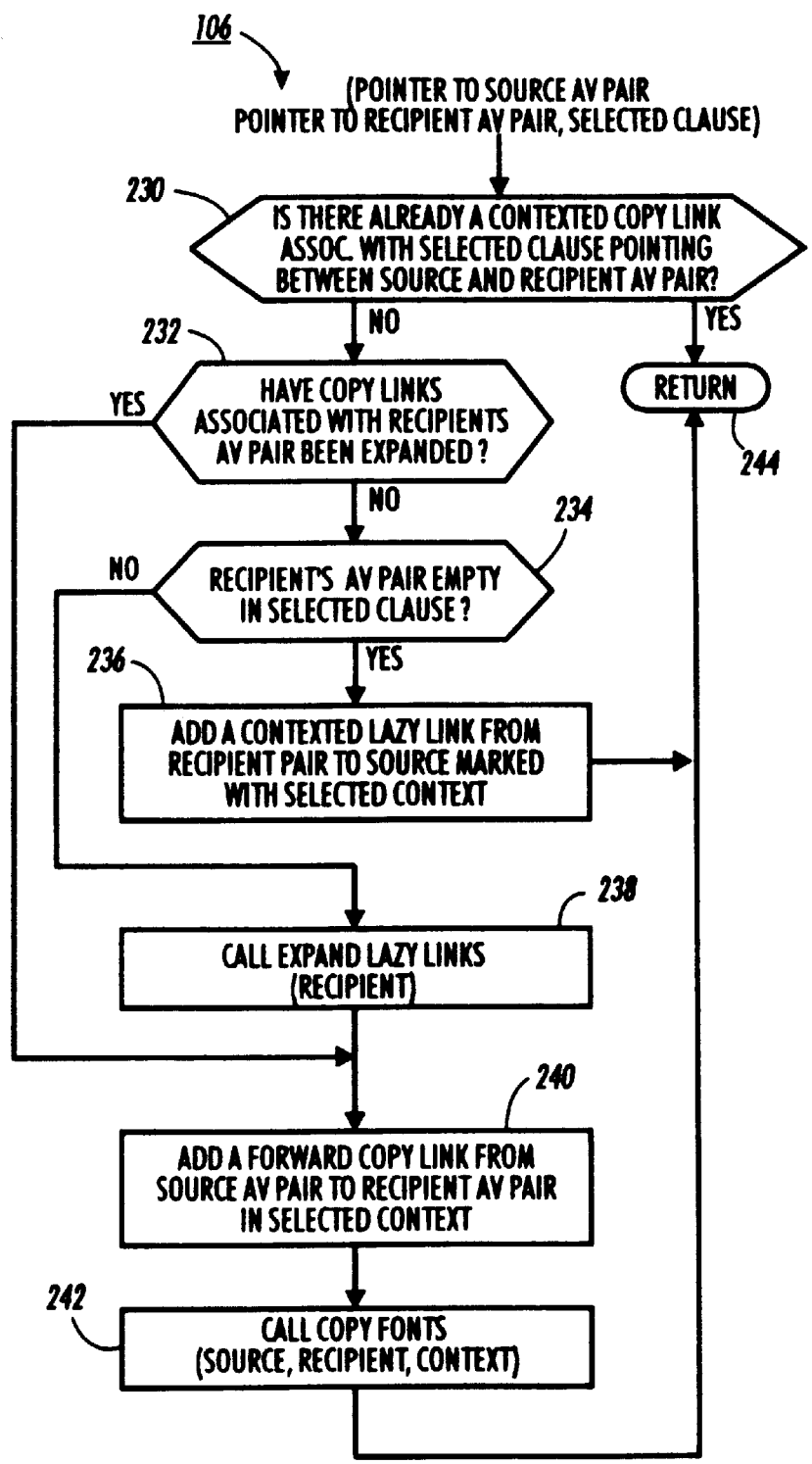
FIG. 10 is a flow diagram of the Copy AV Pair routine.

Copy AVPair 106, illustrated in FIG. 10, enables processor 48 to copy information from a source AVPair data structure into a recipient AVPair data structure. Instructions 106 are used to copy information from daughters into their mother, as well as to copy information from subtrees into their associated edge. Briefly described, instructions 106 attempt to avoid copying information by adding to the recipient AVPair contexted lazy copy links pointing back to the source AVpair. If the relevant information is already represented by a contexted copy link, then processor 48 copies the first level of information from the source into the recipient AVPair via calls to Expand Lazy Links 108 and Copy Facts 110.

Processor 48 begins execution of instructions 106 in response to a pointer to the source AVPair, the recipient AVPair, and a selected clause. During step 230 processor 48 determines whether there is already a contexted copy link between the two AVPairs for the selected clause. Processor 48 makes this determination by examining the copies fields of both the source and recipient AVPairs. If a copy link with the selected clause is found in either the source or recipient, then nothing further need be done and processor 48 responds by branching to step 244. On the other hand, if no contexted copy link with the selected clause exists between the source and recipient AVPairs, processor 48 exits step 230 and branches to step 232.

During step 232 processor 48 begins efforts to determine whether it can represent the source AVPair in the recipient AVPair via a contexted lazy copy link. That depends, in part, upon whether the other lazy copy links of the recipient have already been expanded. Processor 48 determines whether that is the case by examining the expanded bit of the recipient AVPair. If that bit indicates that lazy copy links have not been expanded, processor 48 may be able to represent the source AVPair using a contexted lazy copy link if that link is the recipient AVPair's only lazy copy link in an overlapping context. Processor 48 determines during step 234 whether the recipient AVPair already includes other contexted lazy copy links within the context given as an argument to Copy AVPair by enumerating the lazy copy links that are in the AVPair's copies field and for each lazy copy link conjoining its context with the selected context. If all of the conjunctions are nogood, then processor 48 goes to step 236. On the other hand, if any of conjoined contexts are not nogood, then processor 48 advances to step 238.

Processor 48 advances to step 238 from step 234 when all lazy copy links associated with the recipient AVPair have yet to be expanded. Processor 48 expands those lazy copy links during step 238 by calling Expand Lazy Links 108. Afterward, processor 48 proceeds to step 240.

Processor 48 reaches step 240 when the source AVPair cannot be represented in the recipient AVPair by a lazy copy link. To indicate in the source AVPair that it has been copied into the recipient, processor 48 adds to the copies field of the source AVPair a forward copy link pointing to recipient. Then, in step 242 processor 248 copies the constraints of the source AVPair into the recipient AVPair by calling Copy Facts 110. That done, processor 48 exits step 242 and advances to step 244.

F. The Expand Lazy Links Routine

Figure 11:
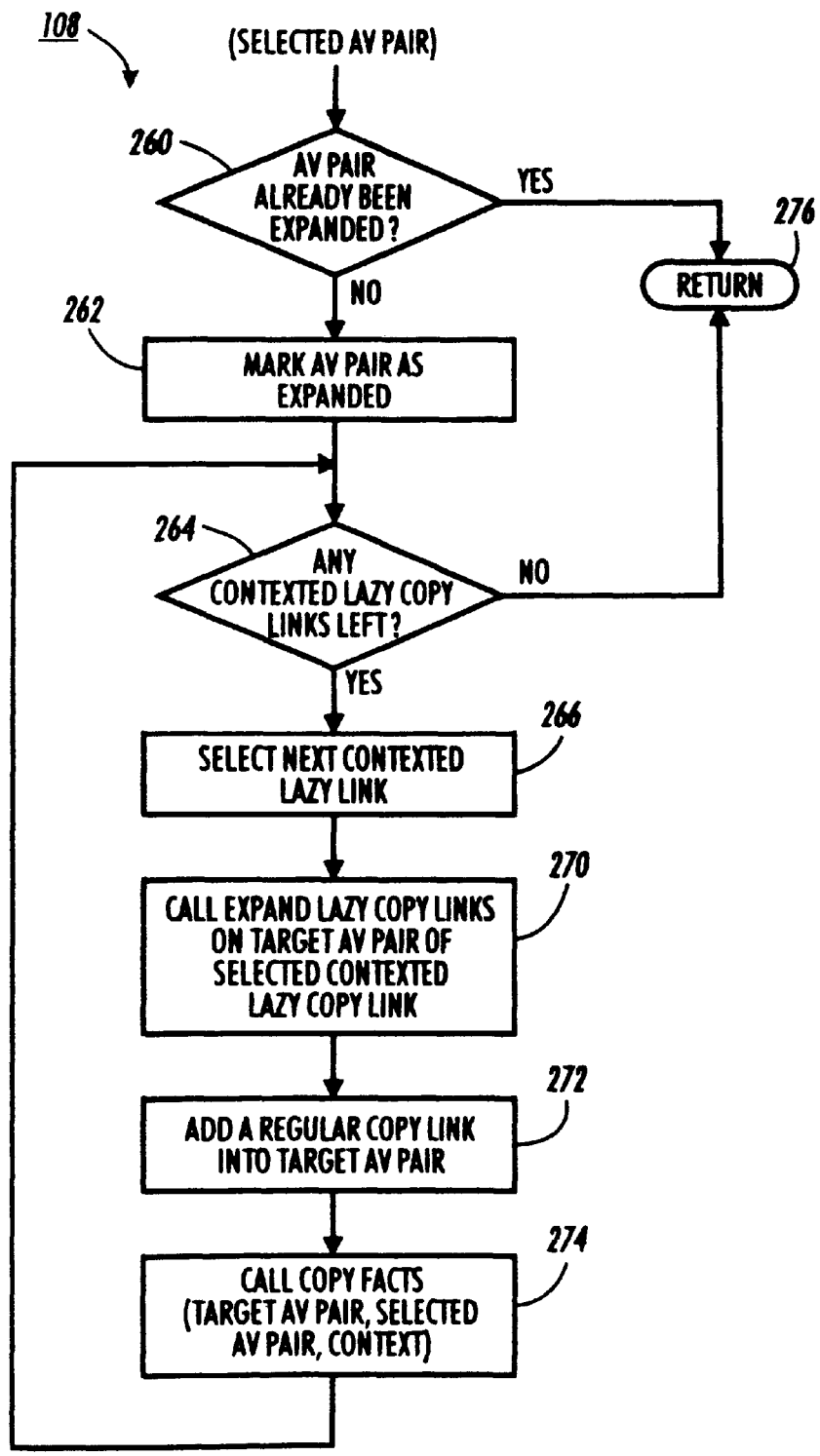
FIG. 11 is a flow diagram of the Expand Lazy Links routine.

Expand Lazy Links 108, illustrated in FIG. 11, enables processor 48 to replace a contexted lazy copy link with one level of greater detail and, if necessary, other contexted lazy copy links. After adding forward copy links in the source to record the expansion of a lazy copy link, processor 48 copies the relevant information by calling Copy Facts 110.

Processor 48 begins execution of instructions 108 with step 260 in response to receipt of a pointer to the selected AVPair, whose lazy copy links are to be expanded. During step 260 processor 48 determines whether the contexted lazy copy links of the selected AVPair have already been expanded by examining the expanded bit. If that bit indicates that contexted lazy copy links associated with the selected AVPair have already been expanded, processor 48 advances to step 276. On the other hand, if the contexted lazy copy links have not yet been expanded, processor 48 branches to step 262 from step 260.

Processor 48 begins expansion of the contexted lazy copy links of the selected AVPair by setting the value of expanded field to indicate expansion. Afterward, processor 48 advances to step 264 to begin expanding the contexted lazy copy links, one contexted lazy copy link at a time. So long as any contexted lazy copy link remains to be expanded, processor 48 advances from step 264 to step 266. During step 266 processor selects for expansion one of the remaining contexted lazy copy links in the copies field. Processor 48 then advances to step 270.

Frequently, the target AVPair pointed to by the selected contexted lazy copy link is represented by lazy copy links, which will also require expansion. In anticipation of such a situation, during step 270 processor 48 calls Expand Lazy Links 108 to expand the lazy copy links pointed to by the selected contexted lazy copy link. During step 272 processor 48 adds a forward copy link pointing from the target AVPair to the selected AVPair. Processor 48 then advances to step 274 from step 272.

Having expanded the target AVpair, processor 48 can now expand the selected lazy copy link by copying one level of information from the target AVpair into the selected AVpair. Processor 48 does so by calling Copy Facts 110. That done, processor 48 returns to step 264 and branches through steps 266, 270, 272, 274, and 264 until every contexted lazy copy link associated with the selected AVPair has been expanded.

G. The Copy Facts Routine

Figure 12:
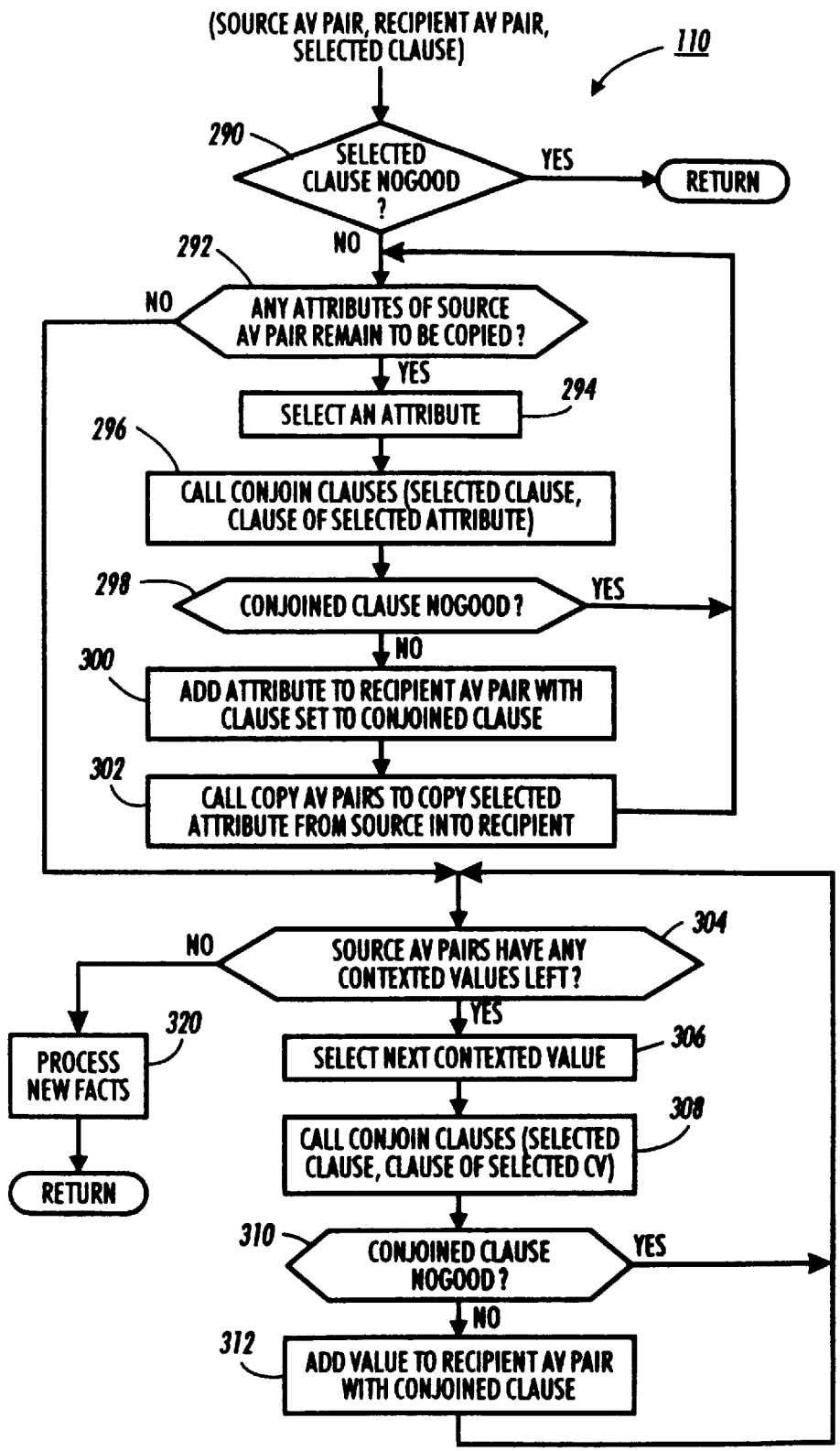
FIG. 12 is a flow diagram of the Copy Facts routine.

FIG. 12 illustrates in flow diagram form the instructions of Copy Facts 110. Briefly, described instructions 110 enable processor 48 to copy information from a source attribute-value pair into a recipient attribute value pair. Each attribute value pair may include a number of attributes, as well as a number of contexted values, to which the attribute value pair is equal. Instructions 110 use analogous means to copy both attributes during steps 292–302 and contexted values during steps 204–312; consequently, only steps 292–302 will be described in detail herein.

Processor 48 begins execution of instructions 110 with step 290 in response to receipt of pointers to the source AVPair and the recipient AVPair, as well as a selected clause, associated with the recipient. Processor 48 begins in step 290 by determining whether any facts need be copied. No facts need be copied if they are associated with a nogood clause. Processor 48 thus examines the nogood field of the clause and if the selected clause is nogood, processor 48 exits step 290 and proceeds to step 292.

With step 292 processor 48 begins efforts to copy the attributes associated with the source AVPair into the recipient AVPair. If any attributes remain to be copied, processor 48 selects one of the remaining attributes during step 292. Next, during step 294 processor 48 conjoins the selected clause with the clause associated with the selected attribute. Processor 48 does so by calling Conjoin Clauses 112, which returns the resulting clause. If the resulting clause is not nogood, processor 48 branches from step 298 to step 300.

During step 300, if there isn't already an AVPair data structure for the recipient, processor 48 creates one that points back to the recipient AVPair and adds a pointer to this new AVPair in the attrs field of the recipient AVPair. Having created a data structure into which information can be copied, processor 48 advances to step 302 and calls Copy AVPair. Copy AVPair may or may not copy information from the source AVPair, depending upon whether there is an interaction between contexted lazy copy links. Afterward, processor 48 exits step 302 and returns to step 292.

Processor 48 branches through the loop of steps 292—302 until Copy AVPair has been called for every relevant attribute of the source AVPair. When that occurs, processor 48 exits step 292 and advances to step 304 to begin copying values of the source AVPair into the recipient AVPair in substantially the same fashion as attributes were copied. After copying all contexted values associated with the source AVPair, processor 48 advances to step 320. During step 320 processor 48 examines the new constraints imposed upon the recipient AVPair and deduces new local nogoods, if possible. That done processor 48 returns to step 322.

H. The Conjoin Clauses Routine

Instructions 60 conjoin two clauses together to produce a new clause, which is cached in the clause cache of memory 50. This is done in a standard fashion for the most part. If the clauses are disjunctive, then each pair of disjuncts is conjoined and the conjoined disjuncts are then disjoined. If the two clauses are conjunctive then all pairs of conjuncts are conjoined and checked to see if the resulting conjoined conjunct is nogood. If none of the conjoined conjuncts are nogood then they are merged together, while eliminating redundant conjuncts.

Two differences do exist between how instructions 60 conjoin clauses and standard approaches. First, before beginning to conjoin two clauses, processor 48 searches the clause cache for an entry involving the same two clauses. Processor 48 starts such a search by examining the cache field of the clause data structure with the higher id to search for the desired operation and operand. If such an entry is found, then the previously stored result can be used without performing the conjoin, saving processing time.

Figure 13:
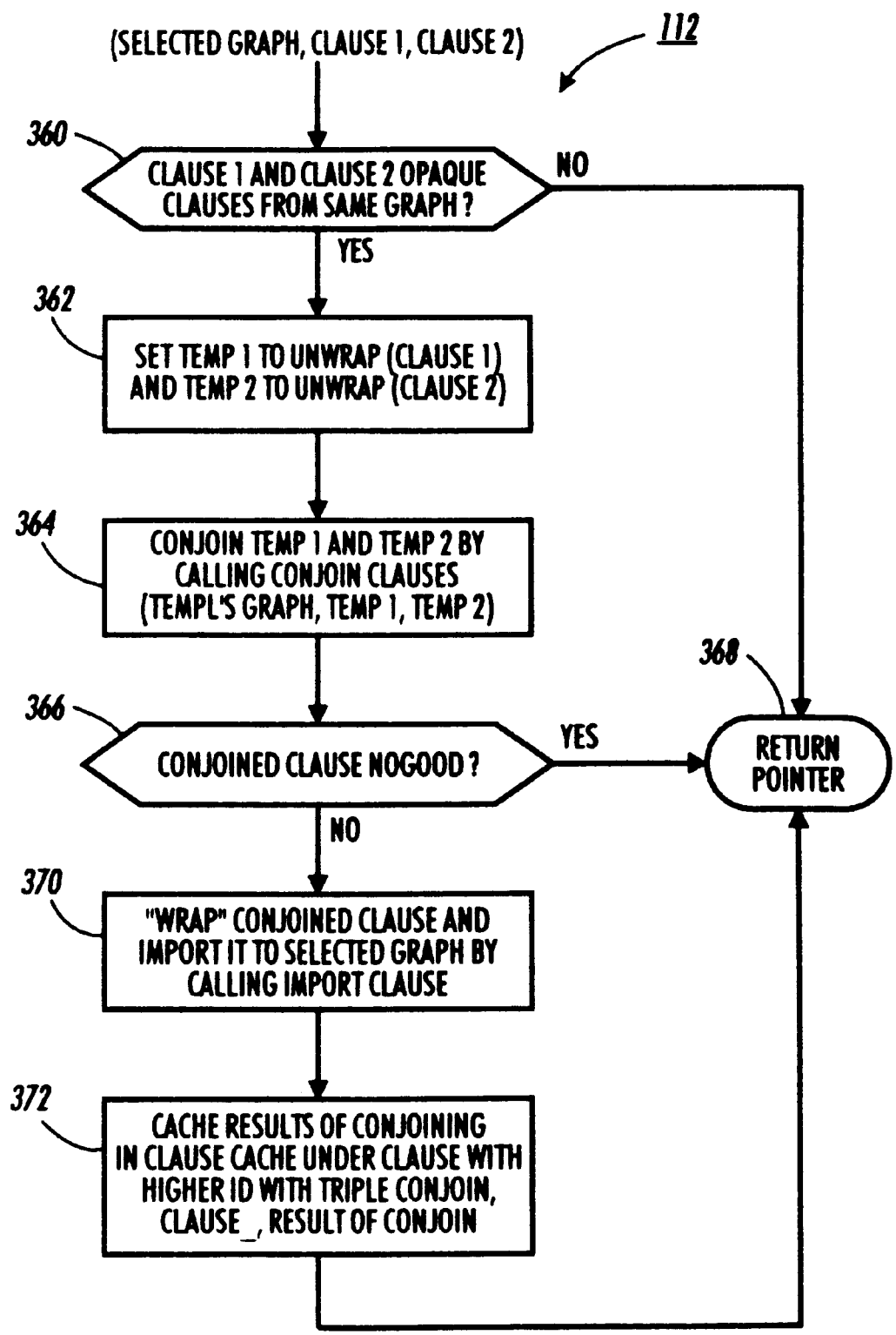
FIG. 13 is a flow diagram of the Conjoin Clauses routine.

The second difference between standard approach to conjoining clauses is the use of opaque clauses. The flow diagram of FIG. 13 illustrates those portions of Conjoin Clauses 112 that handle opaque clauses to reduce unification processing time. Briefly described, when two opaque clauses are imported from the same graph, the two opaque clauses are unwrapped, conjoined together to produce a new clause, the new clause is wrapped to produce a new opaque clause, which is then imported.

Processor 48 begins execution of instructions 112 with step 360. Processor 48 is able to reduce the number of propositional variables imported between graphs when the two opaque clauses are associated with the same graph data structure. Processor 48 checks this possibility during step 360 by examining the graph fields of the two clause data structures to be conjoined, clause 1 and clause 2. If both clauses are associated with the same graph processor 48 exits step 360 and branches to step 362.

Because of the possibility that the conjoining of the two opaque clauses may result in a simpler clause, like TRUE or nogood, processor 48 "unwraps" both clause 1 and clause 2 during step 362. Processor 48 unwraps the opaque clauses by retrieving the imported field of each opaque clause. Afterward, processor 48 conjoins the two unwrapped clauses during step 364 by calling Conjoin Clauses 112. Processor 48 examines the resulting clause during step 366 to determine whether it is nogood. If so, processor 48 advances to step 368 and returns a pointer indicating that the resulting clause is nogood. On the other hand, if the resulting clause is not nogood, processor 48 branches to step 370 from step 366.

Processor 48 'wraps' the resulting clause and then imports the new opaque clause during step 370 by calling Import Clause 116. Processor 48 then advances to step 372 from step 370.

To prevent expending further processing time conjoining clause 1 and clause 2 again, during step 372 processor 48 caches in clause cache of memory 50 the result of conjoining clause 1 and clause 2. Preferably, clauses within the clause cache are indexed according to the clause with the highest id and the information stored is the triple: operator, operand, and resulting clause. In this case, the triple would be: conjoin, clause 2, resulting clause. Afterward, processor 48 stores a pointer to this entry in the clause cache in the cache field of clause data structure for the clause with the higher id. Processor 48 performs step 372 whenever two clauses are conjoined, or disjoined, regardless of whether they are opaque. Caching the results of all operations with clauses helps reduce the processing time to unify graph data structures.

I. The Import Clause Routine

Figure 14:
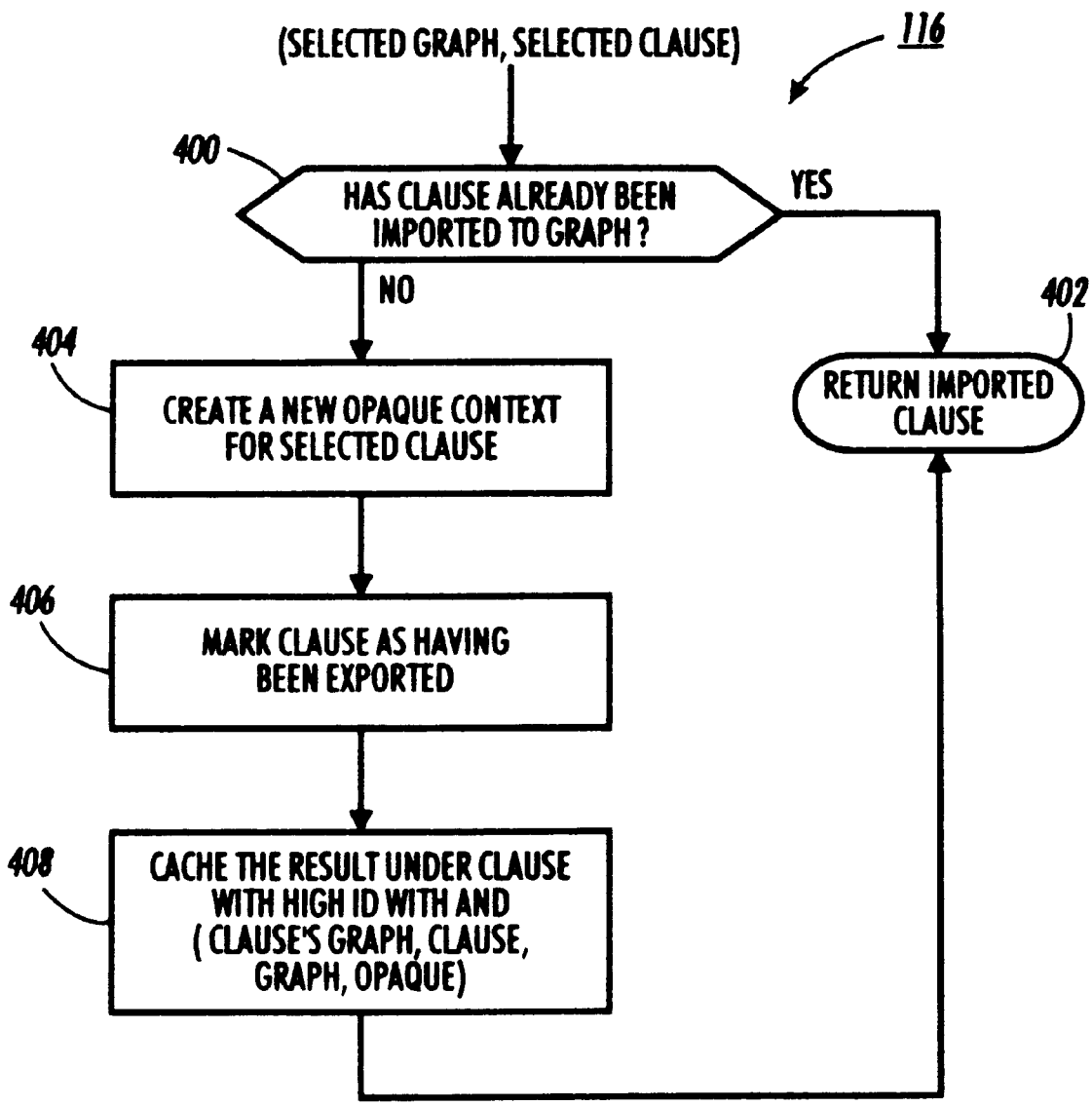
FIG. 14 is a flow diagram of the Import Clause routine.

FIG. 14 illustrates in flow diagram form instructions 116 for importing a clause into a graph. In doing so, processor 48 creates a new opaque clause data structure to "wrap" the clause being imported. This ensures that the graph generated for the root spanning edge will be context-free equivalent where possible by replacing multiple propositional variables with a single propositional variable.

Processor 48 begins execution of instructions 116 by determining during step 400 whether the selected clause, the one to be imported, has already been imported to the selected graph. Processor 48 does so by searching the clause cache for an entry with whose resulting clause is equal to the selected clause. If processor 48 finds such an entry, then the selected clause has already been exported to the selected graph, eliminating the need to do so. In response, processor 48 branches to step 402 from step 400, returning the imported clause. On the other hand, if the clause cache does not indicate that the selected clause has already been exported, processor 48 branches to step 404 from step 400.

During step 404 processor 48 creates a new opaque clause data structure, storing the selected clause in the imported field. Subsequently, during step 406 processor 48 records that the opaque variable has been exported in the imported field and indicates which graph it has been exported to by storing a pointer to the selected graph in the graph field. Finally, during step 408, processor 48 caches the result of this operation in the clause cache of memory 50 by storing the triple: selected clause, opaque, new opaque clause. Having imported the new opaque clause, processor 11 returns to step 402 from step 408.

J. The Get Edge Solutions Routine

Figure 15A:
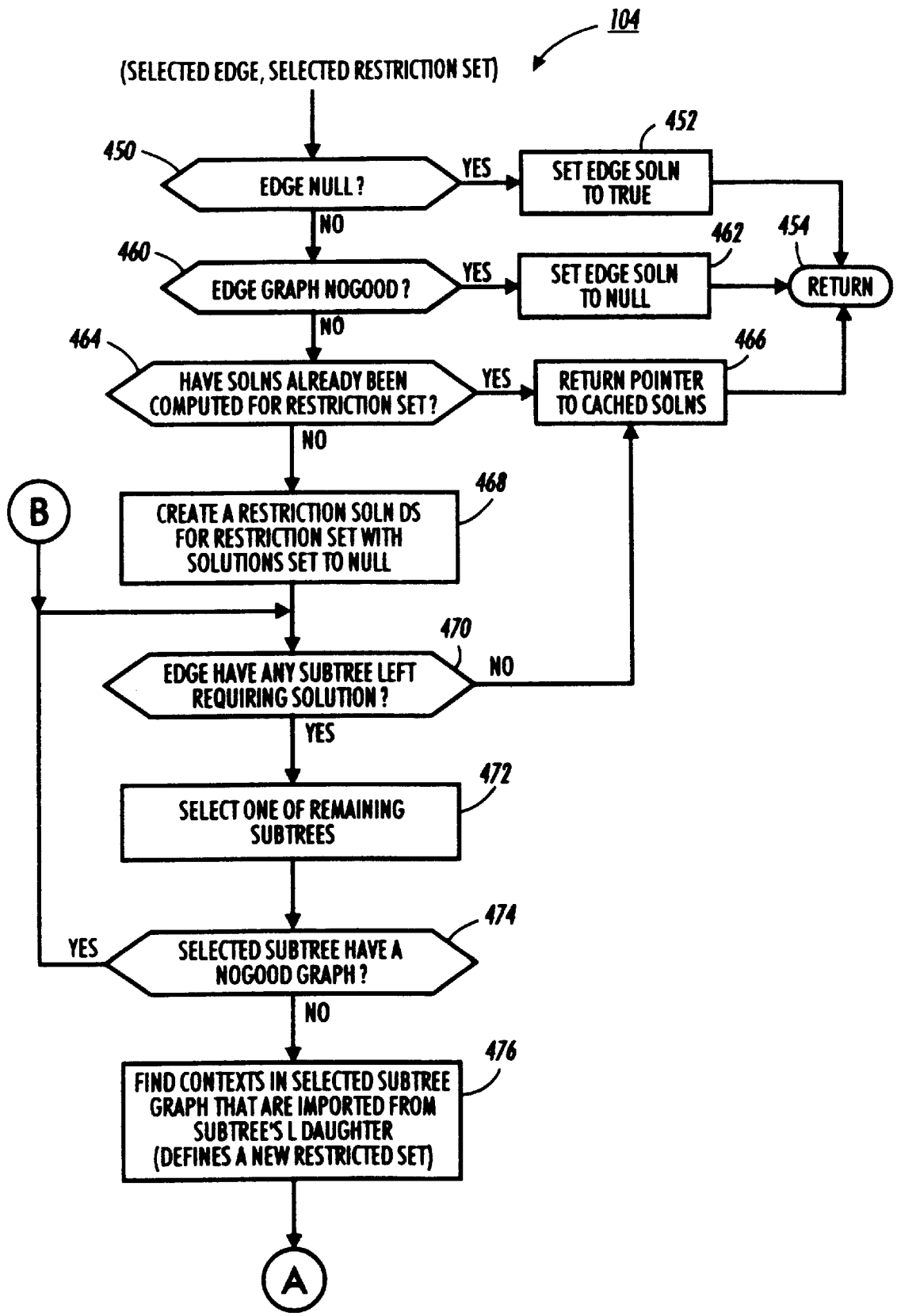
FIG. 15 is a flow diagram of the Get Edge Solutions routine.
Figure 15B:
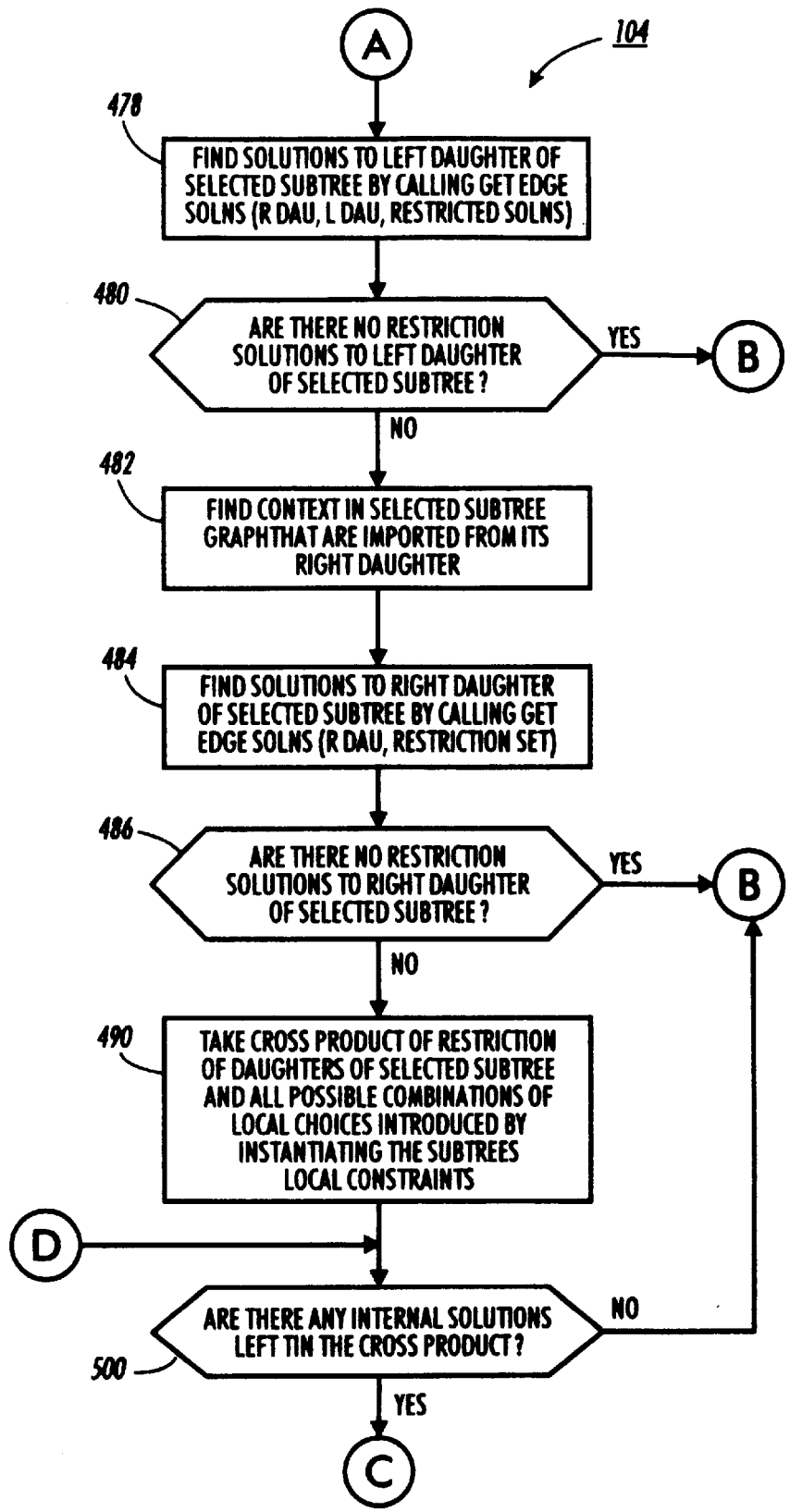
Figure 15C:
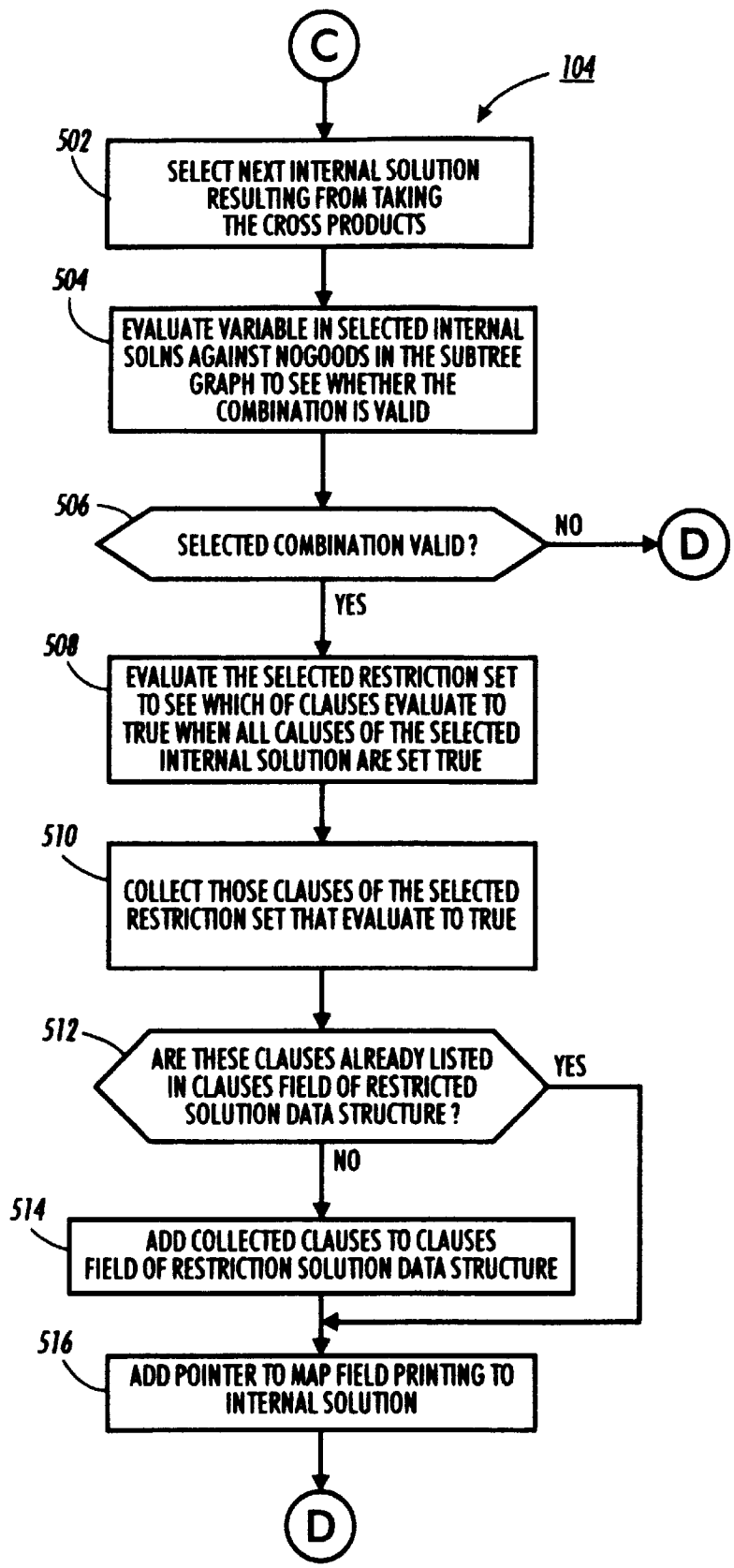

FIG. 15 illustrates in flow diagram form instructions 104 for obtaining solutions for a selected edge given the clauses for which solutions are sought, called a restriction set because solutions may not be sought for all clauses associated with the selected edge. A pointer to the selected edge with which the restriction set is associated is also passed in to instructions 104. Briefly described, Get Edge Solutions 104 generates solutions for the selected edge by finding which combinations of clauses of the restriction set have solutions. Processor 48 identifies possible internal solutions a subtree at a time by first finding solutions to the left and right daughters of the selected subtree. Processor 48 then takes the cross product of the solutions for the left and right daughter. Processor 48 evaluates the validity of the possible internal solutions using the local nogoods. Given internal solutions that are not invalid, processor 48 then determines which of them, when TRUE, cause clauses of the selected restriction set to evaluate to TRUE. Those clauses of the restriction set that evaluate to TRUE are then made into a restriction solution.

Execution of instructions 104 begin with step 450, during which processor 48 begins searching for obvious solutions for the selected edge. There are three. First, processor 48 examines the pointer to the selected edge. If the pointer is null, this means that the selected edge can be successfully combined with any other edge. In response to such a discovery, processor 48 advances to step 452 and indicates that the solution for the selected edge is TRUE. Processor 48 then returns to step 454. On the other hand, if the pointer to the selected edge is not null, processor 48 branches to step 460 to examine another obvious solution for the selected edge. During step 460 processor 48 examines the nogood field of the graph of the selected edge data structure to determine if the selected edge is nogood. If it is, during step 462 processor 48 sets the solution for the selected edge to null and returns to the step 454. When the selected edge is not categorized as nogood, processor 48 exits step 460 to search for the last obvious solution. During step 464 processor 48 searches the solution cache of the graph to see if this restriction set has already been solved. If it has, then processor 48 returns a pointer to the solutions, if any, during step 466.

When the effort to find to an obvious and easy solution fails, processor 48 exits step 464 and advances to step 468. Processor 48 creates a Restriction Solution data structure for the selected clauses in the solution cache, with all fields set to null. That done, processor 48 advances to step 470 to begin searching for solutions for the selected restricted set, a subtree at a time. During step 472 processor 48 selects one of the subtrees still requiring solution. Next, processor 48 next determines whether the selected subtree is nogood by examining the nogood field of the graph data structure for the selected subtree. If the selected subtree is nogood, processor 48 turns its attention to other subtrees by returning to step 470. On the other hand, if the graph for the selected subtree is not nogood, then processor 48 advances to step 476 from step 474.

Finding solutions for the selected subtree requires first finding solutions for the selected subtree's left and right daughters. This effort occurs during steps 476–486. First, processor 48 determines which of the subtree graph's clauses are imported from its left daughter, defining a new restricted set. Processor 48 uses this information during step 478 to find solutions for the left daughter by calling Get Edge Solutions 104. If there are no solutions to the left daughter, there can be no solution to the selected subtree. Processor 48 responds to this situation by branching to step 470 from step 480, turning attention to another subtree. On the other hand, if the left daughter has a solution, then the selected subtree may have a solution. In response, processor 48 branches to step 484 from step 480 to identify solutions to the right daughter of the selected subtree. Processor 48 begins by identifying which of the clauses of the subtree graph have been imported from the right daughter. This defines a new restricted set, which processor 48 uses when calling Get Edge Solutions 104 during step 484. Processor 48 responds to the discovery that the right daughter has no solutions by returning to step 470. If, on the other hand, the right daughter has a solution, processor 48 branches to step 490 from step 486.

Given solutions to the left and right daughters of the selected edge, with step 490 processor 48 begins efforts to identify solutions for the selected edge. These solutions are represented by a Restriction Solution data structure. During step 490 processor 48 creates local solutions based on the disjunctions that were introduced when the local constraints were instantiated. Processor 48 then takes the cross product of the local solutions and solutions to the left and right daughter to produce a number of candidate internal solutions for the selected edge. Processor 48 will examine these candidate internal solutions one at a time during subsequent steps.

Processor 48 selects one of the candidate internal solutions for evaluation and evaluates it using local nogood clauses to determine the validity of the selected candidate internal solution clause. If processor 48 determines during step 506 that the selected candidate internal solution is not valid, processor 48 returns to step 500 to begin evaluating another candidate internal solution. On the other hand, if the selected candidate solution is valid, processor 48 advances to step 508. During that step each of the clauses in the selected candidate internal solution are assumed to be TRUE and the clauses of the selected restricted set are examined to determine which of them evaluate to TRUE. Processor 48 notes those clauses of the restricted set that evaluate to TRUE during step 510 and compares them to those listed in the clauses field of restricted solution data structures associated with the selected restricted set. If not yet included in the solutions to the restriction set, during step 514 processor 48 creates a new restrictions solution with the noted clause and adds it to the solutions for the restriction set. Finally, during step 516, processor 48 adds to the map field of the restriction solution data structure a pointer to the data structure for the selected candidate internal solution.

Having completed evaluation of one candidate solution, processor 48 returns to step 500 to continue examination of candidate internal solutions as described with respect to steps 502–516. After examining of the candidate internal solutions for the selected subtree, processor 48 branches to step 470 from step 500. After processing all the subtrees associated with the selected edge, processor 48 returns to step 454 and returns any solutions to the restriction set.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

Appendix A Definitions

Attribute—An attribute is the name of a grammatical function such as subject, object, number, etc., which takes a value.

Chart—A chart is a data structure for caching the constituents that have already been constructed by a parser.

Clause—A clause is a combination of contexts. More technically, a clause is a boolean combination of propositional variables.

Constituent—A group of words within a string, which may or may not be contiguous within the string. According to this definition, a string may include constituents regardless of whether the grammar being used defines constituents explicitly or implicitly.

Context Free—A grammar is context free when two constituents can be combined with each other without regard to the internal structure of the constituents being combined.

Contexted Copy Link—A copy link, lazy or forward, that has a context other than TRUE.

Contexted Unification—A known method of efficiently unifying disjunctive feature graphs together. It allows disjunctions to be embedded with a feature graph, and produces a database of "nogoods," which represent inconsistent combinations of disjuncts. Contexted unification allows multiple analyses to be represented using a single feature graph. Contexted unification is also referred to as "disjunctive unification."

Disjunction—A complex sentence in logic that is true when either one or both of its disjuncts are true.

Expanding—Expanding is the act of increasing the level of specification of a feature structure so that the resulting feature structure includes information previously omitted and indicated via a lazy link. Expansion may not remove all lazy links from a feature structure because levels below that expanded to are represented via lazy links.

Fact—An attribute or value.

Feature Structure—A representation of a surface grammatical function of a part of a string. This information is represented as a set of ordered pairs, each of which consists of an attribute and a specification of that attribute's value. Feature structures are described notationally by arranging the set of ordered pairs vertically inside square brackets with each attribute value pair placed on a single horizontal line.

Forward Copy Link—A copy link that points forward to the recipient of information from the source of information.

Graph Data Structure—a data structure that represents a feature structure, solutions to the nogood database, and related material.

Interact—A lazy link is said to interact, or to be activated, when it is unified with another lazy link or feature in an overlapping context.

Lazy Copying—A standard technique for unifying feature structures together that only copies those parts of feature structures that interact.

Lazy Copy Link—A copy link that points backward to the source of information from the recipient of the information.

Non-finite Feature Structure—A feature structure that has feature structures as the values of its features.

Opaque Contexts—An opaque context is a context whose complexity is not visible to the graph which imported it, because the context is represented by a propositional variable. Opaque contexts allow nogood databases to be solved as a collection of little databases.

Parsing—A process of analyzing a sentence or string to determine its underlying meaning.

Underspecified—A feature structure is said to be underspecified when it does not include all information necessary to describe its features, instead using lazy links to other feature structures to indicate the omitted information.

Unification—Unification is a combining operation on two disjunctive feature structures that produces a third, conjunctive feature structure. In general the conjunctive feature structure represents more information than either of the feature structures it unifies.

Unspecified—A feature structure is said to be unspecified when it includes only a lazy link to another feature structure or lazy links to one or more other feature structures.

What is claimed is:

1. A method for constructing a graph for an edge from a plurality of graphs associated with a corresponding plurality of subtrees in a natural language processing system, the method comprising the steps of:

creating a first graph for the edge, wherein the first graph is empty upon creation;

creating a disjunct within the first graph by producing a plurality of contexted variables representative of the plurality of graphs associated with the corresponding plurality of subtrees, wherein the disjunct has a number of disjunctions equal to the number of subtrees;

associating a selected subtree graph, chosen from the plurality of graphs associated with the corresponding plurality of subtrees, with a first available disjunction in the first graph; and incorporating information derived from the selected subtree graph into the associated disjunction of the first graph.

2. The method of claim 1, wherein the step of creating a first graph comprises the steps of:

allocating a graph data structure representative of an edge graph; and marking the graph data structure as an "OR" type graph data structure.

3. The method of claim 1, further comprising the step of repeating the associating and incorporating steps for each subtree in the plurality of subtrees.

4. The method of claim 1, wherein the incorporating step comprises unifying the selected subtree graph with the first graph for the edge.

5. The method of claim 1, wherein each of the plurality of contexted variables corresponds to at least one opaque propositional variable.

6. A method for using a processor to construct a graph for an edge from a plurality of graphs associated with a corresponding plurality of subtrees in a natural language processing system, the processor implementing the method by executing instructions stored in a memory, the method comprising the steps of:

creating a first graph for the edge by producing a plurality of contexted variables representative of the plurality of graphs associated with the corresponding plurality of subtrees, wherein the first graph has a number of disjunctions equal to the number of subtrees;

associating each graph in the plurality of graphs associated with the corresponding plurality of subtrees with a respective first available disjunction in the first graph; and unifying each graph in the plurality of graphs associated with the corresponding plurality of subtrees with the first graph by incorporating information from each graph in the plurality into its respective associated disjunction.

* * * * *